(12) United States Patent
Sugita

(10) Patent No.: US 8,004,388 B2
(45) Date of Patent: Aug. 23, 2011

(54) POWER LINE COMMUNICATION APPARATUS AND METHOD FOR OPERATING THE SAME

(75) Inventor: Takehiro Sugita, Kanagawa (JP)

(73) Assignee: Sony Corporation (JP)

( * ) Notice: Subject to any disclaimer, the term of this patent is extended or adjusted under 35 U.S.C. 154(b) by 989 days.

(21) Appl. No.: 11/893,607

(22) Filed: Aug. 14, 2007

(65) Prior Publication Data

US 2008/0088418 A1 Apr. 17, 2008

(30) Foreign Application Priority Data

Aug. 24, 2006 (JP) ................. P2006-227712

(51) Int. Cl.
*G05B 11/01* (2006.01)

(52) U.S. Cl. .............. 340/12.32; 340/12.31; 340/12.33; 370/503; 370/468; 370/498; 370/458; 370/459

(58) Field of Classification Search ................... 340/310.11–310.18; 370/445, 458, 459, 370/468, 498, 503–520
See application file for complete search history.

(56) References Cited

U.S. PATENT DOCUMENTS

| | | | | |
|---|---|---|---|---|
| 3,942,168 A * | 3/1976 | Whyte | ......................... | 340/10.1 |
| 7,233,804 B2 | 6/2007 | Sugaya et al. | | |
| 7,315,524 B2 * | 1/2008 | Ohmi et al. | ................... | 370/322 |
| 7,324,544 B1 * | 1/2008 | Gubbi et al. | ................... | 370/442 |
| 7,639,117 B2 * | 12/2009 | Wiemeyer | ................... | 340/5.61 |
| 2004/0204907 A1 * | 10/2004 | Gutowski | ...................... | 702/182 |
| 2006/0077997 A1 * | 4/2006 | Yamaguchi et al. | .......... | 370/445 |
| 2007/0025384 A1 * | 2/2007 | Ayyagari et al. | .............. | 370/445 |
| 2007/0053360 A1 * | 3/2007 | Hino et al. | ..................... | 370/392 |
| 2007/0058661 A1 * | 3/2007 | Chow | ............................ | 370/445 |
| 2007/0205868 A1 * | 9/2007 | Tanaka | ........................ | 340/10.2 |
| 2007/0230499 A1 * | 10/2007 | Iwamura | ....................... | 370/445 |
| 2008/0317070 A1 * | 12/2008 | Propp et al. | .................... | 370/509 |

FOREIGN PATENT DOCUMENTS

| | | |
|---|---|---|
| JP | 2003-258812 A | 9/2003 |
| JP | 2006-191230 A | 7/2006 |
| WO | 2005/034433 A1 | 4/2005 |
| WO | 2007/040203 A1 | 4/2007 |

OTHER PUBLICATIONS

Overview of CEPCA and Approach to PLC Standardization, Jul. 19, 2006 [Presented by Mark Eyer, Sony], p. 26-28.
Japanese Office Action issued on Aug. 19, 2008 in connection with corresponding Japanese Appln. No. 2006-227712.

* cited by examiner

*Primary Examiner* — Daniel Wu
*Assistant Examiner* — Ryan W Sherwin
(74) *Attorney, Agent, or Firm* — Lerner, David, Littenberg, Krumholz & Mentlik, LLP

(57) ABSTRACT

Herein disclosed a power line communication apparatus which may be assigned a band window and a communication band in alternate and cyclical fashion, the band window being one to which a coexistence signal for band reservation is assignable, the communication band being one to which desired information is assignable, the power line communication apparatus may include a reception processor; a coexistence signal detector; a coexistence signal generator; a transmission processor; and a controller.

12 Claims, 21 Drawing Sheets

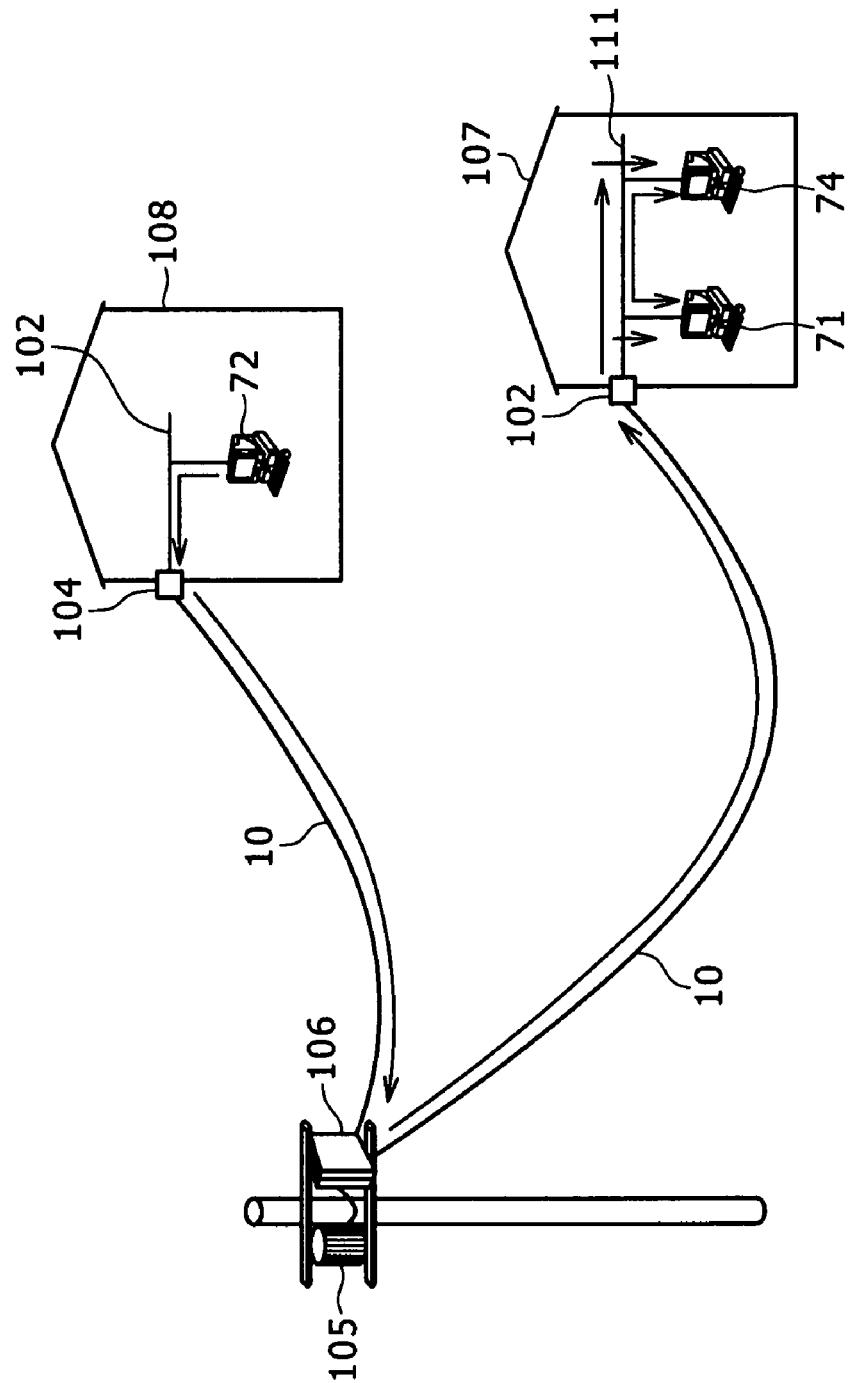

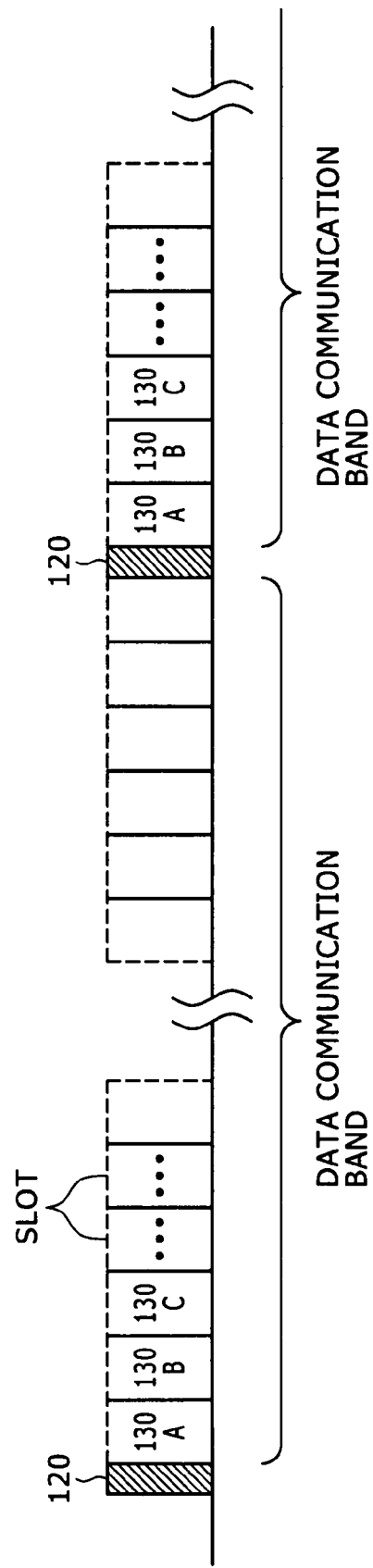

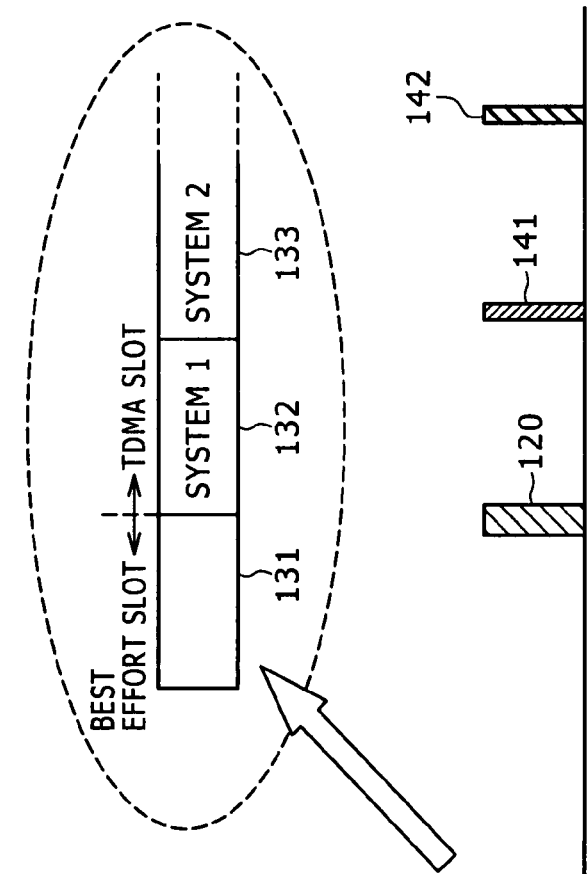
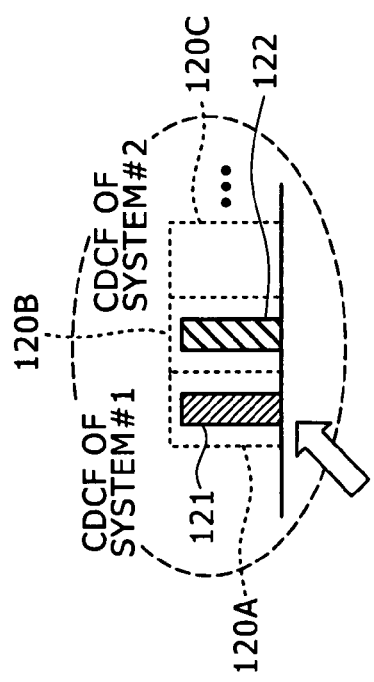

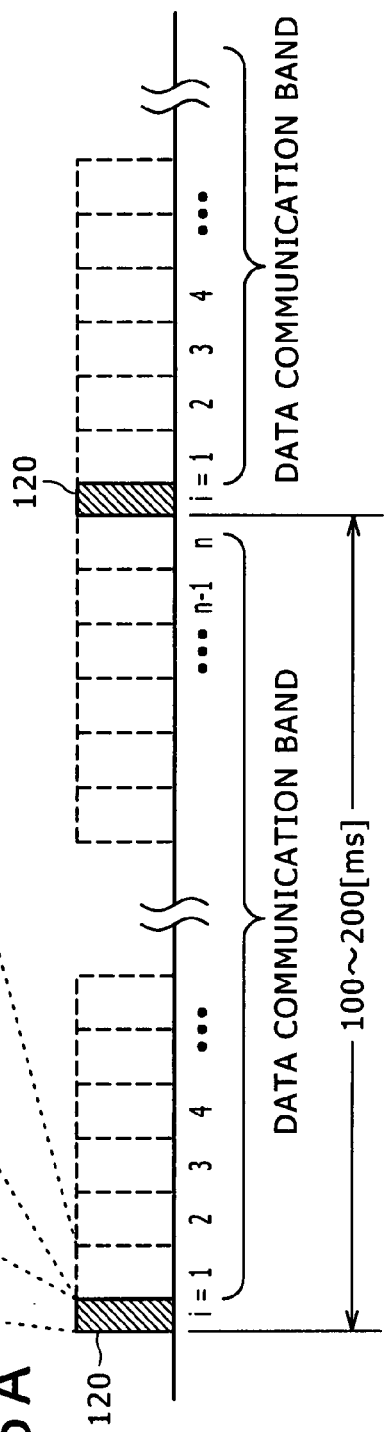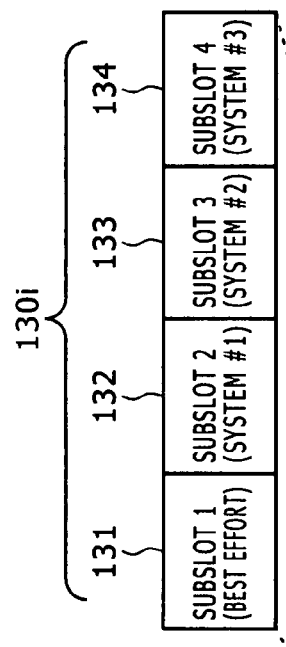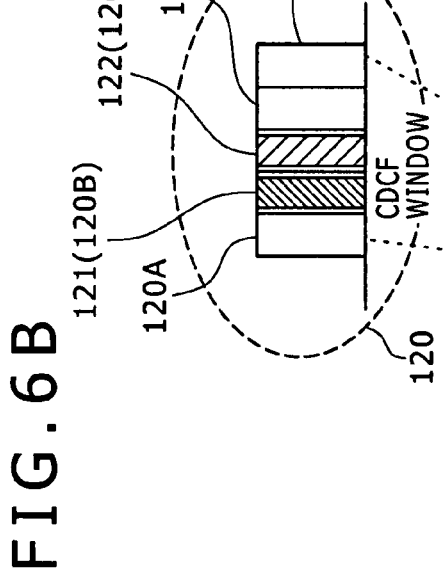

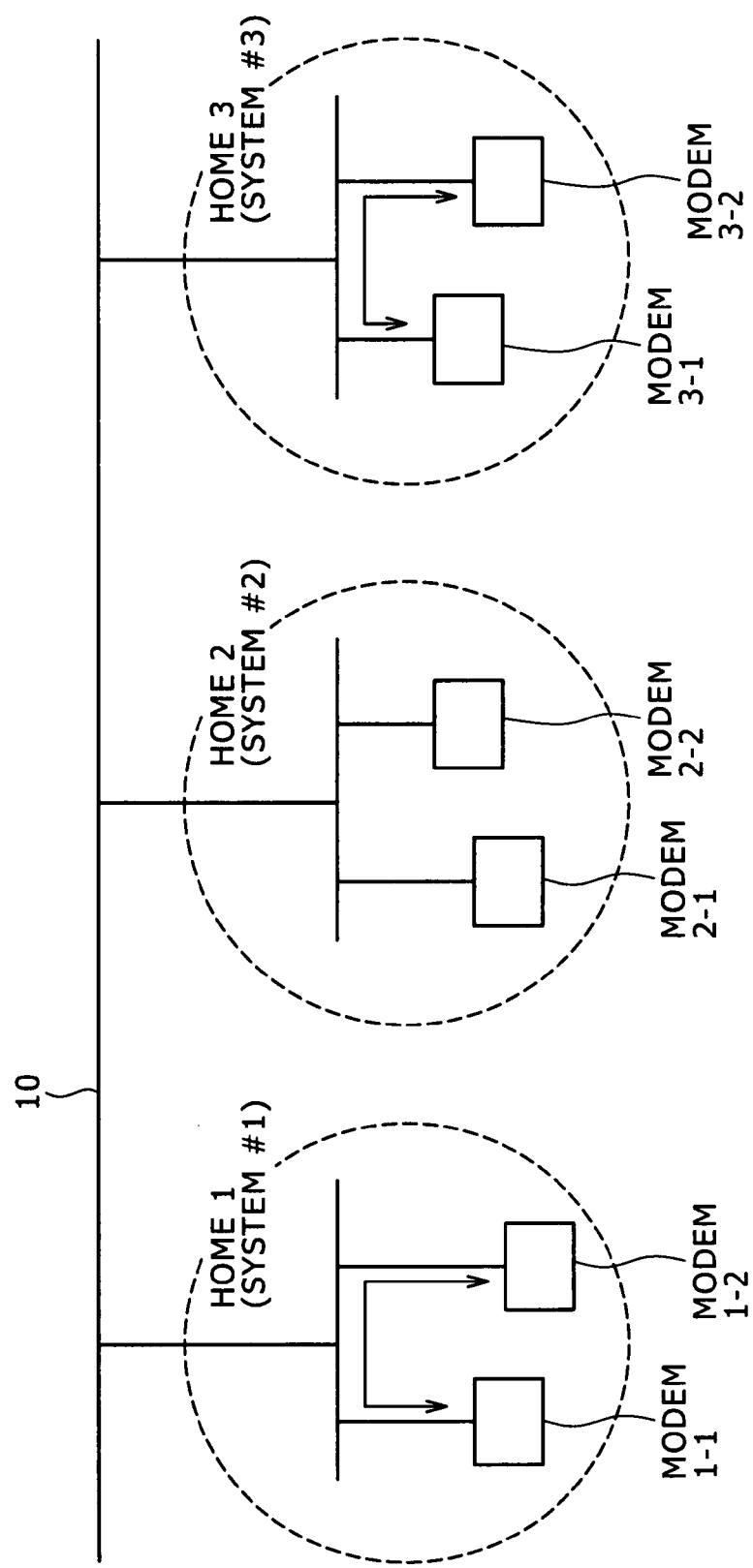

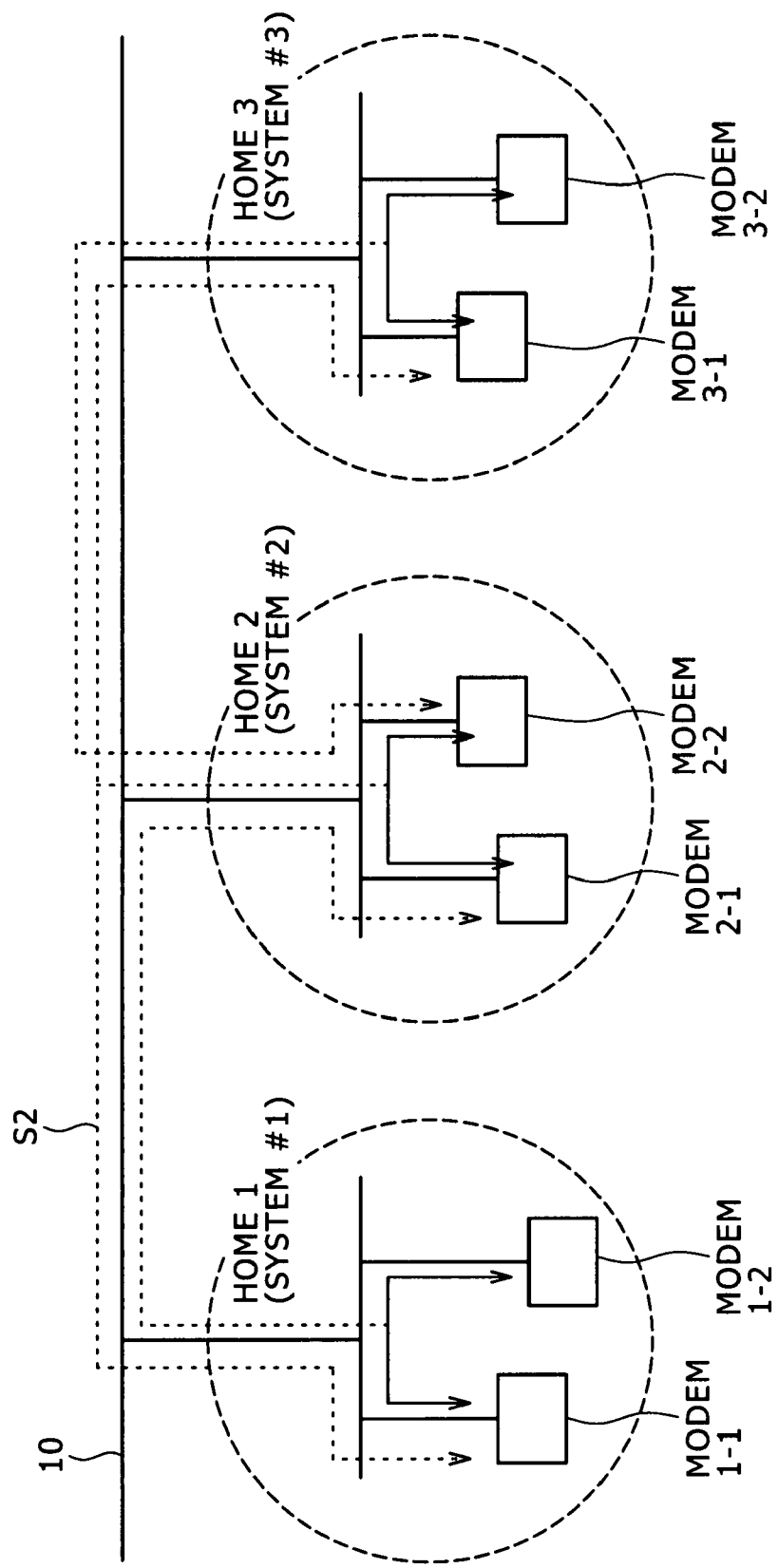

POWER LINE COMMUNICATION APPARATUS AND METHOD FOR OPERATING THE SAME

CROSS-REFERENCE TO RELATED APPLICATIONS

This application claims priority from Japanese Patent Application No. JP 2006-227712 filed in the Japanese Patent Office on Aug. 24, 2006, the entire content of which is incorporated herein by reference.

BACKGROUND OF THE INVENTION

1. Field of the Invention

The present invention relates to a power line communication apparatus to which a band window for band reservation and a communication band for data communication are alternately assigned at predetermined intervals, as well as to a method for operating that power line communication apparatus.

2. Description of the Related Art

There are a number of types of communication apparatuses that utilize the power line for communication purposes. Such communication apparatuses may illustratively adopt, as their modulation system, ASK (amplitude shift keying), FSK (frequency shift keying), or PSK (phase shift keying). As their transmission system, the apparatuses may typically select the single carrier scheme, OFDM (orthogonal frequency division multiplexing), or spread spectrum communication system.

The communication apparatuses of such different systems are known to be incapable of communicating with one another. For example, operating on the same OFDM principle, the apparatuses are unable to communicate with one other if they differ in terms of any one of such system specifications as occupied bandwidth, subcarrier cycles, subcarrier modulation, synchronizing signal, encoding method, access control, and data format. In the description that follows, the term "different systems" will refer to systems with differences therebetween in terms of their communication specifications.

If apparatuses of different systems incommunicable with each other are installed in the same home, their outgoing signals can collide with each other, making communications difficult. In the worst case, all apparatuses could become incapable of communicating with one another. As power line communication apparatuses come into general use from now on, it will become important to devise means and arrangements to minimize or forestall interference between the communication apparatuses of different systems so that they can coexist in a delimited environment.

In order to ensure the coexistence of different wireless communication systems, there have been proposed techniques for controlling the timings of communication between such systems using a signal (beacon signal) that can be exchanged therebetween. One such technique is disclosed illustratively in Japanese Patent Laid-open No. 2003-258812, referred as Patent Document 1.

In a common wireless LAN setup, the beacon signal is typically used as follows: each master station periodically sends out a wireless beacon signal (a kind of OFDM-modulated control packet). A slave station receives the beacon signal on all wireless channels, and selects an optimal master station based on the received beacon signal. The slave station proceeds to request authentication from the selected master station. In turn, the master station determines whether or not to authenticate the slave station requesting connection to the network of its own. If the requesting slave station is successfully authenticated, the master station exchanges management signals with the authenticated station and thereafter treats the slave station as a legitimate wireless LAN terminal.

That is, the beacon signal is a sort of intra-system control signal generated by the master station as a wireless identification signal that identifies the network managed by the master station in question and the devices connected to that network (the network and the connected devices will be generically referred to as the system hereunder). The invention disclosed by Patent Document 1 involves furnishing the beacon signal, commonly defined between systems, with detailed control information such as transmission parameters so as to secure the coexistence of different systems.

In the field of power line communication, there have been proposals to define a CDCF (commonly distributed coordination function) signal as a coexistence control signal (simply called the coexistence signal) recognizable by modems (e.g., PLC modems) or other suitable communication apparatuses of different systems to ensure their coexistence, the CDCF signal being used as the basis for working out the system specifications for band reservation. One such proposal is found in Non-Patent Document 1 titled "Overview of CEPCA and Approach to PLC Standardization," Jul. 19, 2006 (presented by Mark Eyer, Sony), pp. 26-28.

In power line communication, the use of existing power lines has made system standardization a complex and difficult exercise. It is preferred that the specifications for system coexistence be as simple as possible. Although the CDCF signal is based on the OFDM system on the assumption that it has been adopted by a majority of today's high-speed modems, the modems themselves cannot exchange detailed information. The most they can do is to notify one another of the presence of a master station that performs band reservation.

SUMMARY OF THE INVENTION

Patent Document 1 describes how the beacon signal used commonly by different systems allows each of the systems to detect the presence of a wireless network and to verify its ongoing utilization status. In the field of power line communication, the coexistence signal (e.g., CDCF signal) has similar functions but, furnished with detailed information, may not be accepted by many apparatuses because not only new but also existing facilities have been used to set up PLC communication networks. This can be an impediment to promoting the power line communication scheme. In the power line communication specifications, the coexistence signal may be defined as a signal that should be significant in two aspects: the very presence or absence of the signal, and the timing of the signal in a dedicated band (band window).

Non-Patent Document 1 discloses the significance of the regions of times or frequencies assigned within band windows. However, there is neither description of the initial settings for power-up in coexistence mode or standalone mode, nor explanation of the conditions for transition from one mode to the other following the activation.

With a view to preventing interference between different systems, coexistence mode may be selected upon receipt of the coexistence signal even if there is no possibility of such interference. Coexistence mode involves giving priority to averting the collision of data by placing constraints on the times or frequency bands for use in data transmission. In that sense, establishing coexistence mode in the absence of the possibility of data collision can unnecessarily reduce the capacity of data transmission, which can be a major disadvantage.

The present invention has been made in view of the above circumstances and provides a power line communication apparatus which may be capable of establishing a suitable mode at power-on and effecting transition from one mode to another so as to prevent data collision (i.e., interference between systems) while ensuring a sufficient capacity of data transmission, as well as a method for operating that power line communication apparatus.

In carrying out the present invention and according to one embodiment thereof, there is provided a power line communication apparatus which may be assigned a band window and a communication band in alternate and cyclical fashion, the band window being one to which a coexistence signal for band reservation is assignable, the communication band being one to which desired information is assignable, the power line communication apparatus may include a reception processor configured to receive and process a signal from a power line communication network; a coexistence signal detector configured to detect, from the signal received by the reception processor, the presence and signal strength of the coexistence signal, and the timing of the band window which is assigned the coexistence signal; a coexistence signal generator configured to generate a coexistence signal; a transmission processor configured to process a signal and transmit the processed signal onto the power line communication network; and a controller configured to effect control to establish either coexistence mode or standalone mode at power-on, the coexistence mode being one in which the band reservation is made by causing the coexistence signal generator to generate the coexistence signal and by having the transmission processor transmitting the generated coexistence signal, the standalone mode being one in which the band reservation utilizing the coexistence signal is not carried out; the controller being further configured to effect control to make transition from one of the two modes to the other; the establishment of one of the two modes and the transition therebetween being controlled on the basis of the coexistence signal being detected by the coexistence signal detector, on the basis of the signal strength of the coexistence signal if the presence of the signal is detected, or on the basis of both the signal strength of the coexistence signal and the timing of the band window which is assigned the coexistence signal.

Preferably, the controller may establish the standalone mode if the coexistence signal is not detected, or if every coexistence signal detected has a signal strength of less than a predetermined level P3; and the controller may establish the coexistence mode if at least one coexistence signal is detected at power-on and if the signal strength of at least one of the detected coexistence signals is at least on the level P3.

Preferably, if all coexistence signals detected at power-on are found to have signal strength levels less than the level P3, then the controller may control the coexistence signal generator and the transmission processor in such a manner as to transmit a coexistence signal at the timing of the band window of each detected coexistence signal.

Preferably, if one band window is detected which is assigned a coexistence signal with a signal strength of at least the level P3 upon establishment of the coexistence mode, then the controller may control the coexistence signal generator and the transmission processor in such a manner as to transmit a coexistence signal through a band window at the same timing as that of the detected band window; and if a plurality of band windows are detected each of which is assigned a coexistence signal with a signal strength of at least the level P3 upon establishment of the coexistence mode, then the controller may control the coexistence signal generator and the transmission processor in such a manner as to standardize the timings of the detected plurality of band windows and to transmit a coexistence signal through a band window at the standardized timing.

Preferably, with the standalone mode in effect, if the coexistence signal is not detected or if the signal strengths of all detected coexistence signals are less than a predetermined level P2, then the controller may maintain the standalone mode; with the standalone mode in effect, if a plurality of band windows are detected each of which is assigned a coexistence signal with a signal strength of at least the level P2, then the controller may control the coexistence signal generator and the transmission processor in such a manner as to standardize the timings of the detected plurality of band windows, transmit a coexistence signal through a band window at the standardized timing, and effect transition to the coexistence mode; and with the standalone mode in effect, if one band window is detected which is assigned a coexistence signal with a signal strength of at least the level P2, then the controller may effect transition to the coexistence mode without standardizing the timing of the detected band window.

Preferably, upon transition to the coexistence mode without standardization of the timing of the band window, if the timing of the detected band window with the assigned coexistence signal is different from the timing of the band window assigned to this apparatus, then the controller may control the coexistence signal generator and the transmission processor in such a manner as to transmit a coexistence signal through a band window at a timing different from that of this apparatus before effecting transition to the coexistence mode.

Preferably, with the coexistence mode in effect, if at least one of the detected coexistence signals has a signal strength of at least a predetermined level P1 which is less than the level P2, then the controller may maintain the coexistence mode; and with the coexistence mode in effect, if no coexistence signal is detected or if every detected coexistence signal has a signal strength of less than the level P1, then the controller may effect transition to the standalone mode.

Preferably, with the coexistence mode in effect, if at least one of the detected coexistence signals has a signal strength of at least a predetermined level P1 which is less than the level P2, then the controller may maintain the coexistence mode; and with the coexistence mode in effect, if no coexistence signal is detected, or if every detected coexistence signal has a signal strength of less than the level P1 and if the timing of every detected coexistence signal is different from the timing of the band window assigned to this apparatus, then the controller may control the coexistence signal generator and the transmission processor in such a manner as to transmit a coexistence signal through a band window at a timing different from that of this apparatus before effecting transition to the standalone mode.

Preferably, if every coexistence signal detected at power-on has a signal strength of less than the level P3, then the controller may effect transition to the standalone mode without transmitting a coexistence signal.

Preferably, with the coexistence mode in effect, if at least one of the detected coexistence signals has a signal strength of at least a predetermined level P1 which is less than the level P2, then the controller may maintain the coexistence mode; and with the coexistence mode in effect, if no coexistence signal is detected, or if every detected coexistence signal has a signal strength of less than the level P1, then the controller may control the coexistence signal generator and the transmission processor in such a manner as to stop transmitting a coexistence signal before effecting transition to the standalone mode.

Preferably, the controller using random numbers may determine at least either the time at which to stop sending the coexistence signal or the time ranging from the stopping of coexistence signal transmission to resumption of the signal transmission, and may control the coexistence signal generator and the transmission processor in such a manner as to stop transmitting the coexistence signal and to resume the transmission.

According to another embodiment of the present invention, there is provided a method for operating a power line communication apparatus which may be assigned a band window and a communication band in alternate and cyclical fashion, the band window being one to which a coexistence signal for band reservation is assignable, the communication band being one to which desired information is assignable, the method may include detecting, from a received signal, the presence and signal strength of the coexistence signal, and the timing of the band window which is assigned the coexistence signal; checking to determine, upon detection of the coexistence signal, whether a plurality of coexistence signals are detected from a plurality of band windows occurring at staggered intervals; and effecting control in such a manner as to establish either coexistence mode or standalone mode at power-on, the coexistence mode being one in which the band reservation is made by generating the coexistence signal and by transmitting the generated coexistence signal, the standalone mode being one in which the band reservation utilizing the coexistence signal is not carried out; the control effecting further effecting control to make transition from one of the two modes to the other; the establishment of one of the two modes and the transition therebetween being controlled on the basis of the coexistence signal being detected, on the basis of the signal strength of the coexistence signal if the presence of the signal is detected, or on the basis of both the signal strength of the coexistence signal and the timing of the band window which is assigned the coexistence signal.

In the foregoing description with regard to the levels P1, P2 and P3, the term "at least" may be replaced by the wording "as high as or higher than," and the term "less than" by the wording "not in excess of." The resulting significance remains the same.

The power line communication apparatus according to the present invention, as outlined above, may be capable of averting data collision (i.e., interference between systems) while ensuring a sufficient capacity of data transmission by controlling both the establishment of a suitable mode at power-on and the transition from one mode to another.

BRIEF DESCRIPTION OF THE DRAWINGS

FIG. 3 is a schematic view explanatory of how interference can occur between modems in different homes where the inventive system is in use;

FIG. 4 is a schematic view explanatory of band assignments for use with the inventive system;

FIG. 5A is a schematic view showing how CDCF windows and beacon signals are assigned;

FIG. 5B is a schematic view showing how the CDCF window (band window) is structured;

FIG. 5C is a schematic view showing how a communication band is structured;

FIG. 6A is a schematic view detailing band assignments;

FIG. 6B is a schematic view detailing the structure of the CDCF window (band window);

FIG. 6C is a schematic view detailing the structure of the communication band;

FIG. 7 is a schematic view showing three homes constituting three systems in conjunction with the inventive system;

FIG. 8 is a schematic view explanatory of interference that can occur between the systems of, the homes in FIG. 7;

FIG. 12 is a flowchart of steps constituting the first method executed at power-on;

FIG. 16 is a flowchart of steps constituting the second method executed at power-on;

FIG. 20 is a flowchart of steps constituting the third method executed at power-on.

DETAILED DESCRIPTION

Preferred embodiments of the present invention will now be described in reference to the accompanying drawings.

Figure 1:
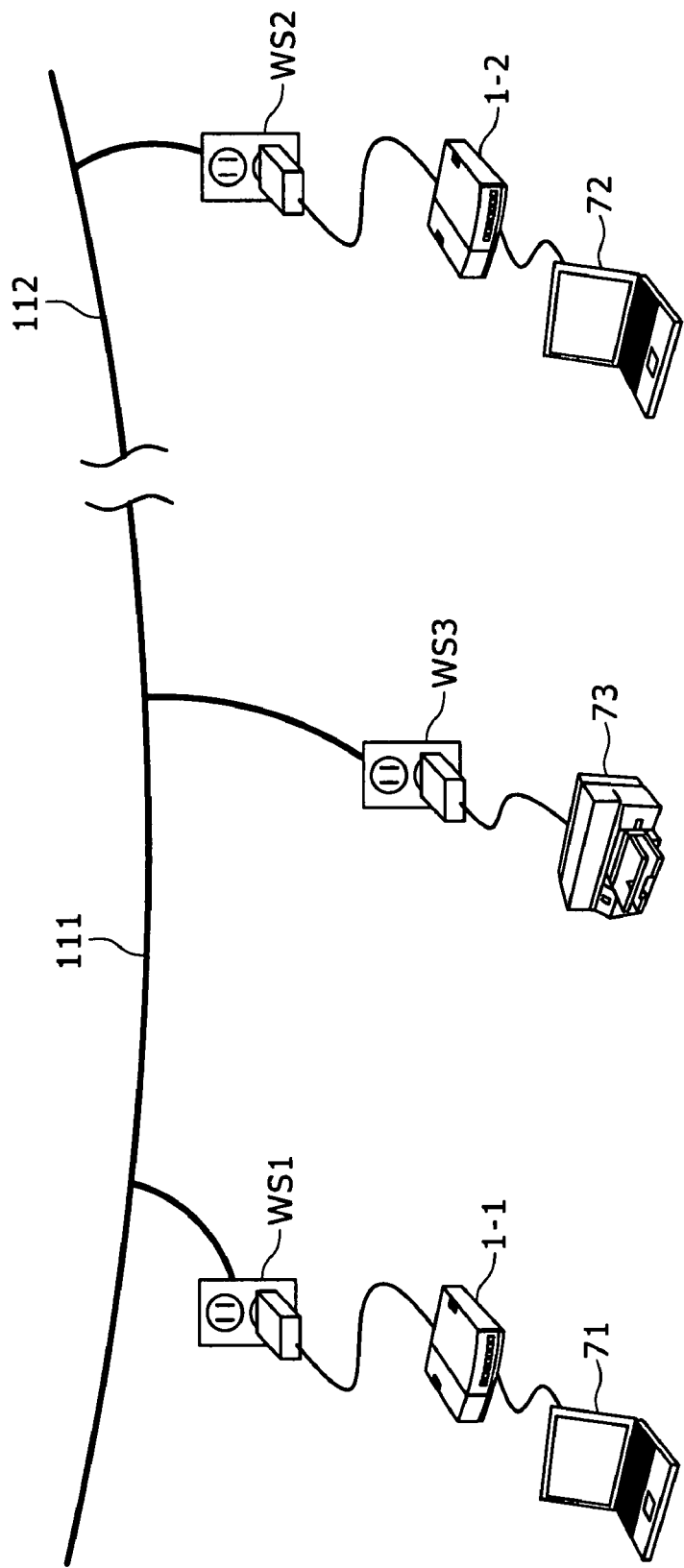
FIG. 1 is a schematic view showing a typical configuration of a power line communication system according to the present invention.

FIG. 1 schematically shows a typical configuration of a power line communication system embodying the present invention. What is outlined in FIG. 1 is the power line communication system that uses power lines 111 and 112 in two homes. Wall sockets WS1 and WS3 are branched out from the power line 111. Illustratively, an AC cord of a communication apparatus 1-1 such as a PLC modem is plugged into the wall socket WS1. A device 71 such as a personal computer (PC) is connected to the communication apparatus 1-1 by way of a LAN cable or the like. Another device 73 unrelated to communication, (e.g., printer) is connected to the wall socket WS3. A reflection or other disturbance in the device 73 can trigger deterioration in the quality of communication.

Meanwhile, a wall socket WS2 is branched out from the power line 112 installed in another home. Illustratively, an AC cord of a communication apparatus 1-2 such as a PLC modem is plugged into the wall socket WS2. A device 72 such as a personal computer (PC) is connected to the communication apparatus 1-2 by way of a LAN cable or the like.

As shown in FIG. 1, power line carrier communication typified by the PLC modem is a scheme of communication that utilizes power lines as transmission lines. Since there is no need to install new communication lines indoors, this communication scheme is expected to gain widespread use as a highly convenient way of communication.

There are two types of power line carrier communication employing power lines for communication purposes, one type utilizing the frequency band ranging from 150 kHz to 450 kHz, the other type making use of the frequency band of 2 MHz through 30 MHz. In Japan, only the equipment using the former frequency band has so far been authorized to be marketed.

The United States recently authorized application of the 2-to-30 MHz frequency band to communication apparatuses. Japanese authorities are also studying the conditions for possible granting of permission in the future to use this frequency band for power line communication. Because the 2-to-30 MHz frequency band is known to let communication apparatuses utilizing that band achieve high-speed data transmission, numerous applications of the scheme have been proposed. Such applications are expected to come into general use in the future.

Although the use of the frequency band of 2 MHz through 30 MHz permits high-speed communication, this does not mean that this frequency band can be divided into a plurality of channels. By contrast, wireless LANs can make use of a broad bandwidth ranging from 100 MHz to 200 MHz that can be divided into a plurality of channels for different uses. With power line communication, a single channel must be shared by different power line communication apparatuses (e.g., PLC modems).

Figure 2:
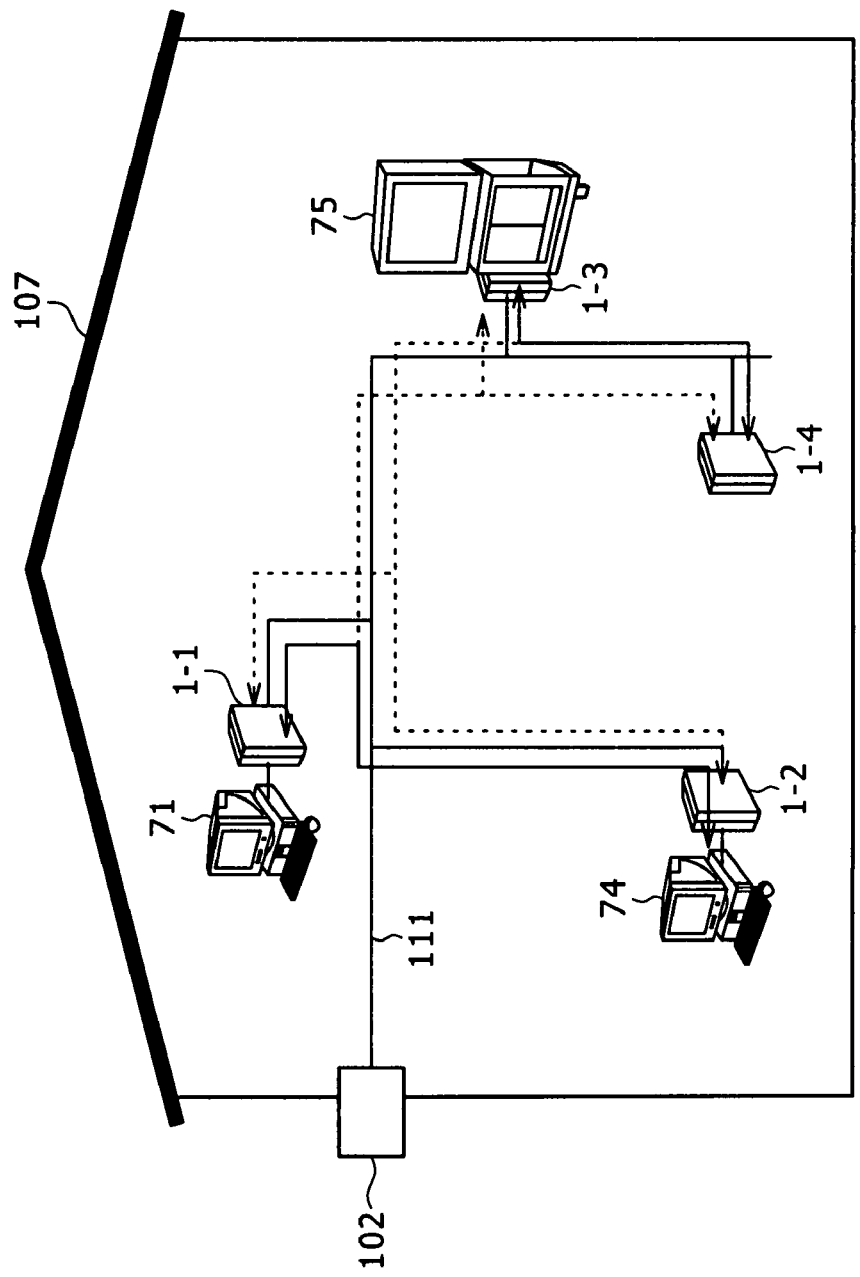
FIG. 2 is a schematic view explanatory of how interference can occur between modems in the same home where the inventive system is in use.

FIG. 2 is a schematic view explanatory of how interference can occur between PLC modems in the same home, and FIG. 3 schematically explains how interference can take place between PLC modems in different homes.

In FIG. 2, the power line 111 is installed in a home 107. The power line 111 is connected to an external power transmission line, not shown, via a switchboard 102. The device 71 is connected to the power line 111 by way of the communication apparatus 1-1. A communication device 74 is connected to the power line 111 through the communication apparatus 1-2. A device 75 is connected to the power line 111 via a communication apparatus 1-3. A communication apparatus 1-4 is also connected to the power line 111. In FIG. 2, the devices 71 and 74 are a PC each; the device 75 is an AV home appliance capable of recording and reproducing videos, and the communication apparatuses 1-1 through 1-4 are a PLC modem each.

In the setup of FIG. 2, it is assumed that the communication apparatuses 1-1 and 1-2 communicate with each other while the communication apparatuses 1-3 and 1-4 communicate with one other, their communication channels being represented by thick lines. Where these two communication channels are implemented by use of the same power line 111, they can interfere with each other as indicated by broken lines in FIG. 2. The interference increases noise components on the power line 111 and can thereby disrupt the communications.

In the setup of FIG. 3, it is assumed that the devices 71 and 74 communicate with one another over the power line 111 in the home 107. Suppose now that another home 108 has its own communication setup installed and activated at about the same time. Illustratively, the communication device 72 connected to the power line 112 may transmit its own signal out of the home 108. The signal is then sent from a switchboard 104 to a repeater 106 (e.g., located on a utility pole) via a power line 10. From the repeater 106, the signal is forwarded over another power line 10 past the switchboard 102 onto the power line 111 in the home 107. In this case, the incoming signal can interfere with the communication between the devices 71 and 74 in the home 107.

What follows is an explanation of the specifications for power line communication, especially with regard to band reservation for system coexistence and band assignments for data communication. In the ensuing description, the CDCF signal is assumed to be used as the coexistence signal. The CDCF signal is an example; the coexistence signal may be called otherwise depending on the PLC specifications in effect.

FIG. 4 is a schematic view explanatory of typical band assignments. According to the illustrated power line communication specifications, a CDCF window 120 as a band window having a predetermined duration is followed by slots 130A, 130B, 130C, etc., each serving as a communication band slot having a predetermined duration. These band assignments constitute a single cycle that is repeated.

The CDCF window 120 is defined as a band window that may be assigned a coexistence signal at a timing specific to each of different systems operating by different modulation methods, the signal being used for band reservation permitting the coexistence of such different systems. The slots 130A, 130B, 130C, etc., between CDCF windows 120 are each defined as a communication band that may be assigned desired information in a time domain specific to each of the different systems.

FIG. 5B schematically shows how the CDCF window is structured, and FIG. 5C is a schematic view showing how the slot 130$i$ ($i$: any alphabetic character) is structured.

The CDCF window 120 is divided into a number of blocks. The example of FIG. 5B indicates only the blocks in which to transmit CDCF signals. As shown in FIG. 5B, a CDCF signal 121 of system #1 is transmitted in a block 120A, and a CDCF signal 122 of system #2 is sent in a block 120B. Although a block 120C corresponds to system #3, no CDCF signal is shown transmitted in this block. These blocks are provided in a manner reflecting the systems that can coexist in a given setup. The presence of a CDCF signal in a given block determines the timing of that CDCF signal inside the CDCF window (band window).

The blocks in the CDCF window may be provided in diverse forms. Illustratively, the blocks may be divided by frequency into those for in-home system purposes and those for accessing system purposes. The blocks may also be divided on a system-by-system basis into those being used by a given system and those requested to be used and indicated as such. Alternatively, the blocks may include those indicating the presence of an accessing system and the distinction between TDM (time division multiplex) and FDM (frequency division multiplex) in effect. As another alternative, some of the blocks may indicate or require that not band reservation connection but best effort type traffic be in use. As a further alternative, some of the blocks may accommodate a signal for requesting a timing change in the CDCF window, the signal being used to switch from one system to another.

The blocks above become significant in terms of domain (time domain, i.e., timing or frequency domain). That is, what is important is which of the blocks carries the CDCF signal. In the example of FIG. 5B, CDCF signals are set in the blocks 120A and 120B, indicating that band reservations have been made or are being carried out for the coexistence of systems #1 and #2.

The usage of the slot 130$i$ ($i$: slots 130A, 130B, 130C, etc.) shown in FIG. 5A is defined in conjunction with the specifications of the CDCF window 120 as follows: each slot includes a subslot 131 for best effort connection, and as many data transmission subslots (e.g., TDMA subslots 132, 133, etc.) as the number of systems envisaged for the CDCF window 120, as shown in FIG. 5C.

If the CDCF signal 121 of system #1 is found in the CDCF window 120, then the TDMA subslot 132 of each slot becomes usable; if the CDCF signal 122 of system #2 exists within the CDCF window 120, then the TDMA subslot 133 of each slot becomes usable. This relationship holds for other systems as well.

The slot structure above permits band reservation. If no band reservation is made, then the subplot 131 for best effort connection will be used. The activity ratio in this case affects transmission speed. With band reservation in effect, by contrast, the transmission of the CDCF signal ensures preferential use of the domain of interest to the exclusion of the effects from any other system.

As described, the CDCF signal is intended basically to arbitrate PLC modems of different systems in such a manner that the data and control signals these modems use will not overlap with one another when transmitted. In that sense, the CDCF signal differs from the beacon signal that serves as an indicator of each system.

The beacon signal announces the presence of a master station of each system. For that purpose, the beacon signal is usually transmitted at constant intervals that are uniquely defined for each system as long as the master station remains active. As shown in FIG. 5A, the beacon signal is transmitted by use of the slot 130i. In FIG. 5A, a beacon signal 141 of system #1 and a beacon signal 142 of system #2 are shown transmitted.

For the master station to transmit its beacon signal requires making a band reservation by use of the CDCF signal in advance. Since the beacon signal is unique to each system, any one system cannot detect the beacon signal of any other system. In the example of FIG. 5A, the beacon signal 141 can only be seen (i.e., detected) by system #1, and the beacon signal 142 can be detected solely by system #2.

Upon activation of a communication apparatus such as a PLC modem, a plurality of CDCF signals may be detected, and beacon signals may or may not be detected. In such cases, it is necessary to arbitrate between different systems, and it may also be necessary to arbitrate within a given system.

The intra-system arbitration by use of beacon signals is basically dependent on the proprietary specifications of PLC modem manufacturers.

This embodiment of the present invention deals with steps up to the detection of a beacon signal. Thereafter, the communication apparatus that has detected the beacon signal arbitrates within the system by exchanging control signals with the master station that transmitted the beacon signal.

The band assignments of the subsequent data domain (e.g., usable subslots inside slots) are determined in temporal reference to the CDCF window. For that reason, for systems to detect one another by use of their CDCF signals requires matching the timings of the corresponding CDCF windows. Under the rules of coexistence involving CDCF signals, no band reservation can be made and the signals can interfere with one another if the timings of the CDCF windows concerned are not matched.

In the description that follows, the practice of matching the timings of CDCF windows will be referred to as the standardization of window timings.

Which of the multiple CDCF signals detected belongs to the own system is determined by detecting beacon signals and the system information that follows each beacon signal. Because the system information usually occupies at least 32 bits when formed, this information cannot be exchanged in a coexistence environment involving CDCF signals. With regard to this coexistence environment, a rule merely stipulates that data domain assignments for each system be arranged chronologically (or by frequency band) in order to avoid the collision of data from the different systems.

FIGS. 6A through 6C show typical subslot assignments.

In this example, as illustrated in FIG. 6A, the CDCF window 120 is repeated at predetermined time intervals (e.g., 100 to 200 ms). The interval between two CDCF windows 120 is temporally divided into further intervals (e.g., 10 to 20 ms each) accommodating as many as "n" slots 130i (i=1, 2, 3, 4 ..., n-1, n).

As shown in FIG. 6B, each CDCF window 120 includes five blocks 120A through 120E. For this example, each slot domain 130i is temporally divided into four subslots 131 through 134.

The presence of a CDCF signal in the first block 120A of the CDCF window 120 signifies the availability of data transmission using the subslot 131. Likewise, the CDCF signal found in the block 120B means that data can be transmitted using the subslot 132; the CDCF signal in the block 120C indicates that data can be sent using the subslot 133; and the CDCF signal in the block 120D shows that data can be forwarded through the subslot 134.

In this example, the subslot 131 is assigned to best effort type data transmission, and the other three subslots 132, 133 and 134 are assigned to band reservation type traffic. The subslots 132, 133 and 134 are set to correspond to systems #1, #2 and #3, respectively.

The last block 120E in the CDCF window is used to signal a request for a change of CDCF window timings. If the timing change request signal is found in the block 120E, the master station of any other system which detected the CDCF window in question must change the timing at which to transmit its own CDCF window.

The timing of CDCF window transmission may be determined illustratively in increments of power frequency cycles. If the duration of the CDCF window 120 is 200 ms and if a timing change can be made in increments of one-sixth of the power frequency, then there will be 60 different timings that can be adopted for the CDCF window provided the frequency of the AC power supply is 50 Hz. Upon receipt of the CDCF window timing change request signal, the master station replaces the currently used CDCF window timing of the own system with any one of the other 59 possible window timings.

The above-mentioned standardization of window timings can be accomplished by transmitting the window timing change request signal and by making sure that the window timings are matched.

It should be noted that the standardization of window timings does not necessarily mean transmitting the change request signal repeatedly until the window timings are matched. The practice of the standardization of window timings includes sending the change request signal only once, i.e., not requesting any other system to change its window timing but changing the window timing of the own system. The more modems complying with the rule that any master station upon receipt of a window timing change request signal must change its window timing, the more progress is expected in the standardization of window timings. In that sense, the wording "standardization of window timings" covers both complete timing standardization and the work to standardize window timings.

With the above arrangements in place, the CDCF signal of the own system or that of any other system is correctly received. Even if the systems involved are likely to interfere with one another, the possible collision of their data can be avoided by resorting to the standardization of (or the work to standardize) their window timings.

FIG. 7 schematically shows three systems (in three homes in this case). In a home 1, modems 1-1 and 1-2 communicate with each other through the power line. In a home 3, modems 3-1 and 3-2 communicate with one another likewise.

For this example, it is assumed that a power line 10 between the homes 1 and 3 is sufficiently long (i.e., extending over a long distance) and that the system of a home 2 located between the two homes 1 and 3 is inactive and incurring little interference with either home.

In the above setup, the signal strength level at which the CDCF signal from the home 3 is detected by the home 1, as well as the level at which the CDCF signal from the home 1 is detected by the home 3, is either nonexistent or detectable but so low that little interference takes place. These two active systems can thus operate independently.

Suppose now that while communication is being conducted in the homes 1 and 3 of the setup in FIG. 7, a modem 2-1 or 2-2 of the home 2 is activated.

Figure 9:
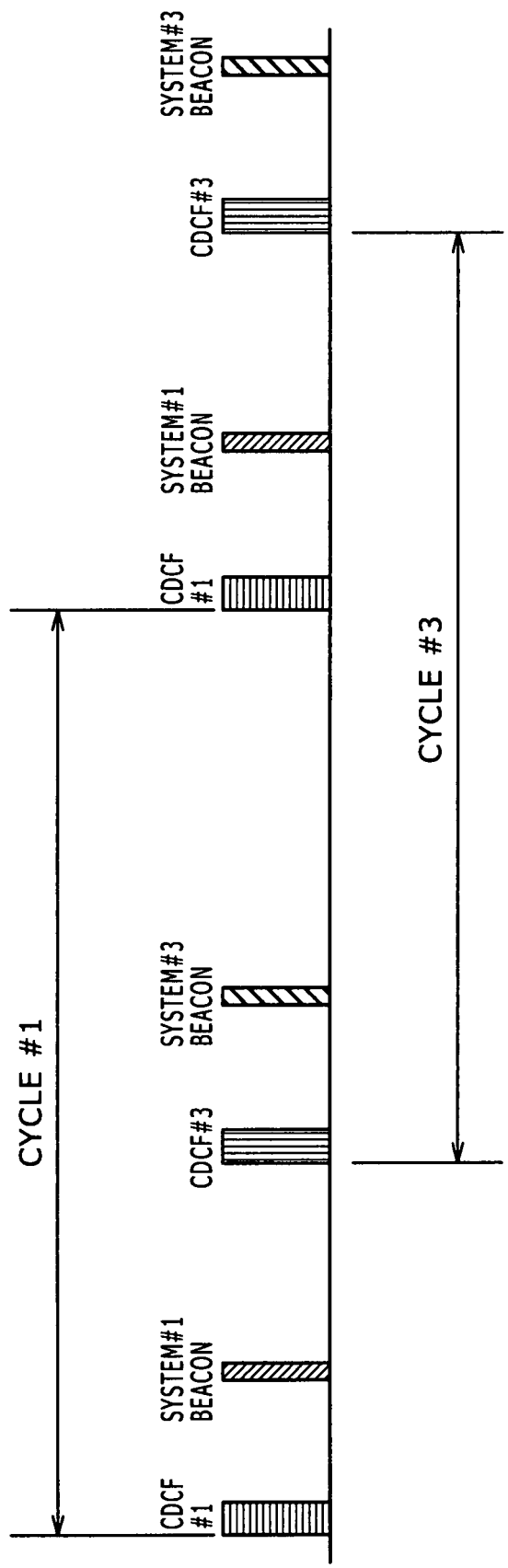
FIG. 9 is a schematic view showing typical signals that may be detected upon activation of the modems in the home 2 of FIG. 7.

This can trigger interference as illustrated in FIG. 8. FIG. 9 shows signals that are typically detected when the PLC modem is activated in the home 2.

Upon activation of the system in the home 2, two CDCF signals transmitted from the homes 1 and 3 are detected by the home 2 at sufficiently high signal strength levels. It might happen that as shown in FIG. 9, the two CDCF signals are detected at different timings (i.e., in staggered cycles). The beacon signal of the own system might also be detected by each of the systems involved following each CDCF signal.

Since the CDCF signal includes no detailed information as mentioned above, the system of the home 2 upon activation is incapable of knowing which system to follow for operation. If each of the two CDCF signals is followed by beacon signals and if one of the beacon signals is detected by the home 2, the system of the home 2 is unable to determine according to which CDCF signal the received beacon signal is being transmitted because the CDCF signals contain no detailed information.

If the home 2 starts transmitting its signal S2 without taking proper steps of activation as shown in FIG. 8, the system of the home 2 can interfere with the systems of the homes 1 and 3. Such interference upon activation of the home 2 needs to be avoided by use of the CDCF signal.

Because of the high reliability required of the CDCF signal, the specifications for communications involving the CDCF signal stipulate that the signal be detected even at very small S/N ratios. For this reason, the CDCF signal is arranged to be detected even if its level is extremely low.

Whereas the use of the CDCF signal makes it possible to avoid interference between power line communication apparatuses, interference does not necessary occur every time a CDCF signal is detected. The reason is that if the power ratio of the received signal from the communicating party with regard to the CDCF signal is in excess of a minimum S/N ratio necessary for demodulating data, then the detection of the CDCF signal will not trigger interference with the signal from another system. If an undesirable wave signal is coming from any other system, and if the power ratio of the received signal with regard to the power sum of the undesirable wave signal and the CDCF signal is in excess of the minimum S/N ratio required for data demodulation, then the detection of the CDCF signal will not cause interference with the signal from the other system.

The absence of interference with any other communication apparatus permits data transmission using the same timing, which improves communication capacity. However, the currently established specifications for power line communication do not specify the conditions under which to select coexistence mode upon activation or the conditions under which to establish standalone mode. If coexistence mode were selected every time a coexistence signal is received following activation in a standalone state, that would mean establishing coexistence mode even where interference does not actually occur between the systems involved. Such practice would be unacceptable because it unnecessarily reduces the available capacity of data communication.

The above-described disadvantages are circumvented by this embodiment of the present invention defining the algorithms for mode establishment upon activation and for transition from one mode to another in the form of the inventive apparatus outlined earlier.

That is, according to the present invention, there is provided a power line communication apparatus which is assigned a band window and a communication band in alternate and cyclical fashion, the band window being one to which a coexistence signal for band reservation is assignable, the communication band being one to which desired information is assignable, the power line communication apparatus including: a reception processor configured to receive and process a signal from a power line communication network; a coexistence signal detector configured to detect, from the signal received by the reception processor, the presence and signal strength of the coexistence signal, and the timing of the band window which is assigned the coexistence signal; a coexistence signal generator configured to generate a coexistence signal; a transmission processor configured to process a signal and transmit the processed signal onto the power line communication network; and a controller configured to effect control to establish either coexistence mode or standalone mode at power-on, the coexistence mode being one in which the band reservation is made by causing the coexistence signal generator to generate the coexistence signal and by having the transmission processor transmitting the generated coexistence signal, the standalone mode being one in which the band reservation utilizing the coexistence signal is not carried out; the controller being further configured to effect control to make transition from one of the two modes to the other; the establishment of one of the two modes and the transition therebetween being controlled on the basis of the coexistence signal being detected by the coexistence signal detector, on the basis of the signal strength of the coexistence signal if the presence of the signal is detected, or on the basis of both the signal strength of the coexistence signal and the timing of the band window which is assigned the coexistence signal. The power line communication apparatus thus embodied will be discussed in more detail below by taking a PLC modem as an example.

Figure 10:
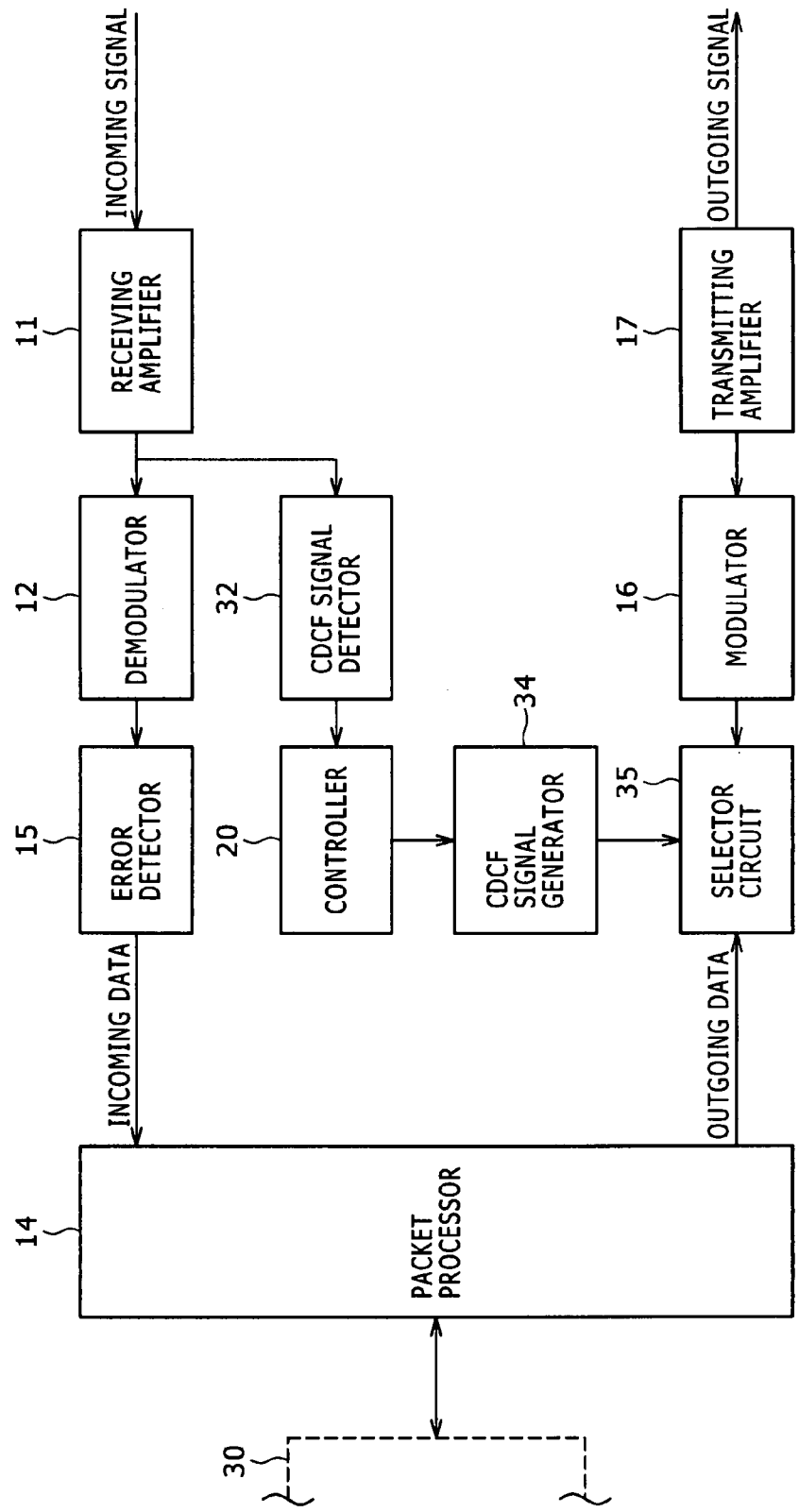
FIG. 10 is a block diagram showing a power line communication apparatus according to the present invention.

FIG. 10 is a block diagram of a PLC modem according to the present invention.

This PLC modem includes a receiving amplifier 11, a demodulator 12, and an error detector 15. These three functional blocks constitute the reception processor of this embodiment of the invention. The reception processor is a circuit that receives and processes signals coming from a power line communication network, not shown.

The receiving amplifier 11 is a gain amplifier capable of controlling the gain of the incoming signal. The demodulator 12 is a circuit that converts the gain-controlled incoming signal into a digital signal. That is, the received signal is first demodulated by the demodulator circuit using a method corresponding to the modulation method by which the signal in question was generated for transmission. The demodulated signal is then turned into digital data.

The error detector 15 is either a circuit or a software block which detects any error from the digital data and which extracts received data (packets) therefrom.

The PLC modem in FIG. 10 further includes a packet processor 14, a selector circuit 35, a modulator 16, and a transmitting amplifier 17. The modulator 16 and transmitting amplifier 17 constitute the transmission processor of this embodiment. The packet processor 14 is a circuit that verifies the destination to which to forward received data packets and performs other necessary packet-related processing. The packet processor 14 is connected to an upper-layer block 30 that processes the data having undergone the packet processing.

The modulator 16 and transmitting amplifier 17 are connected serially to the packet processor 14 via the selector circuit 35.

Using outgoing data (packets) from the upper-layer block 30 past the packet processor 14 and selector circuit 35, the modulator 16 modulates a carrier wave (AC power wave) according to a predetermined modulation method and thereby generates an outgoing signal. The transmitting amplifier 17 is a circuit that controls the gain of the outgoing signal. From the transmitting amplifier 17, the gain-controlled outgoing signal is output onto the power line communication network, not shown.

The PLC modem in FIG. 10 further includes a CDCF signal detector 32, a CDCF signal generator 34, and a controller 20. The CDCF signal detector 32 serves as the coexistence signal detector of this embodiment. The CDCF signal generator 34 acts as the coexistence signal generator of the embodiment. Either the beacon signal or the CDCF signal generated by the CDCF signal generator 34 is selected by the selector circuit 35 for output to the modulator 16. The controller 20 controls these components when carrying out necessary steps upon activation of this embodiment.

The basic operation of the above-described structure will now be explained.

The signal amplified by the receiving amplifier 11 is input to both the demodulator 12 and the CDCF signal detector 32. The demodulator 12 demodulates the incoming signal and forwards the demodulated signal to the error detector 15. The error detector 15 carries out error detection (and correction) processes on the signal before sending the processed incoming data to the packet processor 14.

The packet processor 14 checks to determine whether the incoming data constitutes packets to be received and processed by this apparatus. If the incoming data is found to constitute such packets, then the packet processor 14 transfers the incoming data to a downstream processor (i.e., upper-layer block 30).

The CDCF signal detector 32 detects CDCF signals from the incoming signal and inputs what is detected to the controller 20. The result of the detection includes the presence or absence of a CDCF signal or signals, their signal strength levels upon reception, and their timings at detection. On the basis of the result of the detection by the CDCF signal detector 32, the controller 20 determines whether to select coexistence mode or to remain in standalone mode (i.e., to establish either coexistence mode or standalone mode or effect transition from one mode to the other). If this apparatus serves as the master station, then the controller 20 generates a CDCF signal transmission request.

The CDCF signal includes not only the request for a band in the form of its presence in one of the blocks 120A through 120D of the CDCF window as shown in FIG. 6B; the signal also includes a window timing change request in the form of the presence of a window timing change request signal in the block 120E. The CDCF signal generator 34 generates a CDCF signal that reflects the content of the transmission.

That is, under control of the controller 20, the CDCF signal generator 34 puts the CDCF signal into one of the blocks 120A through 120D in the CDCF window (FIG. 6B), or places the window timing change request signal into the block 120E. The CDCF signal generated by the CDCF signal generator 34 (with or without the window timing change request signal) is output to the selector circuit 35.

The data received from the upper layer is packetized by the packet processor 14 before being input to the selector circuit 35.

The selector circuit 35 selects either the outgoing packets from the packet processor 14 or the CDCF signal (with or without the window timing change request signal) from the CDCF signal generator 34. What is selected by the selector circuit 35 is forwarded to the modulator 16.

The modulator 16 modulates either the outgoing packets or the received CDCF signal and outputs the result of the modulation to the transmitting amplifier 17. The transmitting amplifier 17 amplifies the modulated signal up to a predetermined power level and outputs the amplified signal onto the power line communication network as an outgoing signal.

Figure 11:
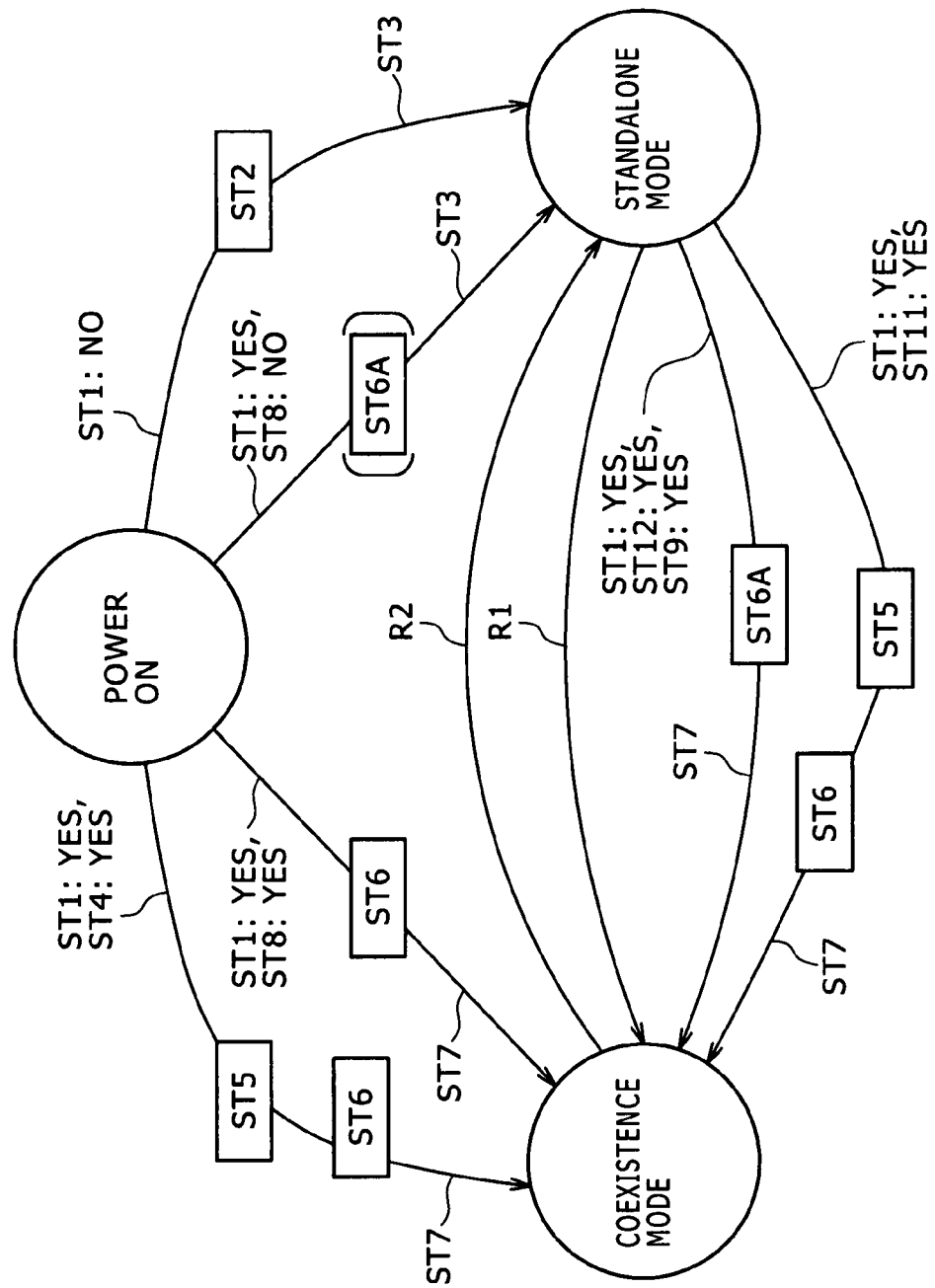
FIG. 11 is a state transition diagram of a first method according to the present invention.

FIG. 11 is a state transition diagram of a PLC modem.

The PLC modem typically has three states: power-on state in which the modem is activated; a state called coexistence mode in which CDCF the signal is used; and a state called standalone mode in which coexistence is rejected. The standalone mode rules out the coexistence with any other modem using the CDCF signal, but allows the master station to establish a specific communication band reservation with some other station, such as each of different systems emitting different beacon signals. The coexistence mode permits coexistence of different systems using CDCF signals, and also allows the master station to have a specific communication band reservation with each different system.

<First Method: at Power-on>

Figure 12:
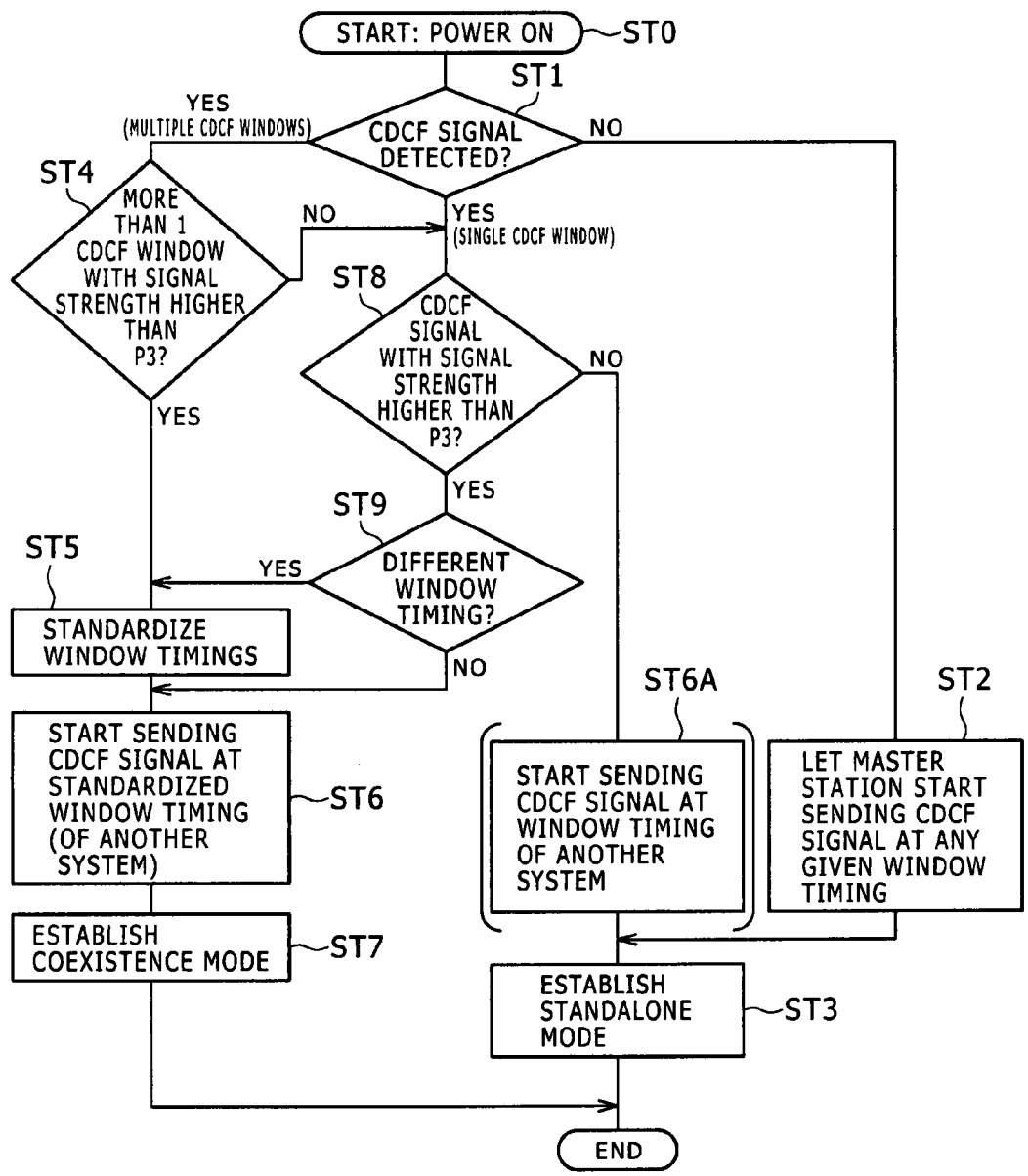

FIG. 12 is a flowchart of steps constituting the first method executed at power-on for mode establishment. In FIG. 11, the step numbers found in FIG. 12 are used to represent the routes and processes followed or carried out in establishing modes.

What is outlined in FIG. 12 is a typical procedure of the first method.

The process flow in FIG. 12 will be described below by referring to FIG. 11 as needed.

In step ST0, the PLC modem is activated. In step ST1, the CDCF signal detector 32 in FIG. 10 checks to determine if any CDCF signal is found. The check in step ST1 determines the presence of any CDCF signal or signals, the number of CDCF windows (i.e., number of detected timings out of 60 CDCF window timings where the power frequency is 50 Hz), and the strength of the detected CDCF signal or signals. The check is carried out illustratively over a time period sufficiently longer than the duration of the CDCF window 120 shown in FIG. 6A (e.g., 100 to 200 ms).

If no CDCF signal is detected in step ST1, that means there is no other system that can interfere with this modem which, as the master station, can transmit its CDCF signal at any timing. In this case, step ST2 is reached and the master station starts transmitting its CDCF signal at any window timing. More specifically, this modem starts sending its CDCF signal at a given window timing, makes a band reservation, and starts outputting a beacon signal to become the master station.

The term "any window timing" above points to one window timing selected illustratively out of the 60 window timing candidates (where the power frequency is 50 Hz). If another PLC modem belonging to this system is arranged to become the master station taking precedence over this modem, then step ST2 may be skipped. Thereafter, step ST3 is reached and standalone mode is established. This brings the process flow to an end.

Where no other system is detected which can interfere with this modem, the process route applicable to this case is indicated in FIG. 11 as "POWER ON" followed by "ST1: NO," "ST2," "ST3" and "STANDALONE MODE," in that order.

If in step ST1 a plurality of CDCF windows are detected, then step ST4 is reached. In step ST4, the controller 20 in FIG. 10 checks to determine whether a plurality of CDCF windows are detected which have a signal strength of at least P3 each and which occur at different timings. Illustratively, the different timings mean they are among the above-mentioned 60 timing candidates.

If the result of the check in step ST4 is affirmative ("YES"), i.e., if multiple CDCF windows are detected along with CDCF signals each a signal strength of at least P3 each and occurring at different timings, then step ST5 is reached. In step ST5, the above-mentioned standardization of window timings is carried out. The standardization in this case may involve either issuing the window timing change request signal once or repeatedly to the CDCF signal-transmitting parties, or changing the own window timing.

In step ST6 following step ST5, this modem starts sending its CDCF signal at the standardized window timing. More specifically, the modem starts outputting its CDCF signal at the window timing resulting from the standardization (or from the work to standardize timings), makes a band reservation, and starts sending a beacon signal to become the master station. Since the window timings have been standardized, the timing of this modem will not overlap with the timing of the CDCF signal from any other system. Thereafter, step ST7 is reached and coexistence mode is established. This brings the process flow to an end.

Where the standardization of window timings is carried out, the process route applicable to this case is indicated in FIG. 11 as "POWER ON" followed by "ST1: YES," "ST4: YES," "ST5," "ST6," "ST7" and "COEXISTENCE MODE," in that order.

If in step ST1 a single CDCF window is detected, then step ST8 is reached. In step ST8, the controller 20 checks to determine whether the CDCF signal has a signal strength of at least P3. If the signal strength of the CDCF signal is found less than P3, then the result of the check in step ST8 is negative ("NO").

In this case, there is little possibility of interference between systems and standalone mode might be established then and there (in step ST3). Preferably, however, step ST6A may be introduced here and the transmission of the CDCF signal may be started at the window timing of the other system. Since the signal strength level of the detected CDCF window is less than P3, with little concern for interference between signals, any window timing may be selected for CDCF signal transmission. Still, in view of the possibility of subsequent transition from the currently established standalone mode to coexistence mode, it is preferable to transmit the CDCF signal at the CDCF window timing of the other system that has been detected. Hence the optional execution of step ST6A. In this case, partly similar to the case above, this modem starts sending its CDCF signal at the window timing of the other system, makes a band reservation, and starts outputting a beacon signal to become the master station.

Where one CDCF signal is detected with a signal strength of less than P3, the process route applicable to this case is indicated in FIG. 11 as "POWER ON" followed by "ST1: YES," "ST8: NO," "(ST6A)," "ST3" and "STANDALONE MODE," in that order.

If the result of the check in step ST4 is negative ("NO"), i.e., if there is one CDCF window with a signal strength of at least P3, then step ST8 is reached. If the result of the check in step ST8 is negative ("NO"), then the subsequent process route is the same as that in effect when a single CDCF window is detected along with the CDCF signal having a signal strength of less than P3.

If the result of the check in step ST8 is affirmative ("YES"), that means there is one CDCF signal having a signal strength of at least P3. This requires using the same CDCF window timing as that of the CDCF signal in question so that the CDCF signal timing of this modem will not overlap with the timing of the CDCF signal transmitted by the other system. In this case, control is passed on to step ST9. In step ST9, a check is made to determine whether the detected window timing differs from that of the own system.

If the window timings are found to coincide with one another, then step ST6 is reached followed by step ST7 in which coexistence mode is established in the same manner as described above. Because the window timings are not standardized here, transmission of the CDCF signal is started in step ST6 at the window timing of the other system.

If the window timings are found to be different in step ST9, then step ST5 is reached and the window timings are standardized. Thereafter, steps ST6 and ST7 are reached and coexistence mode is established as described.

Where there exists at least one CDCF signal with the signal strength of at least P3, coexistence mode is always established. The process route applicable to this case is indicated in FIG. 11 as "POWER ON" followed by "ST1: YES," "ST8: YES," "ST6," "ST7" and "COEXISTENCE MODE," in that order.

The typical procedure of the first method shown in FIG. 12 may be divided into the following three operational aspects:

(1) If the CDCF signal of any other system is not detected at power-on, or if the CDCF signal of some other system is detected but found to have a sufficiently low signal strength (less than P3), then transition is effected to standalone mode.

(2) If the CDCF signal of some other system is detected but standalone mode is established, this modem transmits its CDCF signal using the same CDCF window timing.

(3) If it is possible for this modem to transmit its CDCF signal at the same window timing as that of the CDCF signal from some other system and if the CDCF signal from the other system is at least on a signal strength level that requires coexistence (i.e., at least P3), then transition is effected to coexistence mode.

<First Method: Transition from Standalone Mode to Coexistence Mode>

What takes place in standalone mode according to the first method will now be described in reference to the flowchart of FIG. 13. In the ensuing description, like reference characters will designate like or corresponding steps or processes and their detailed description will be omitted where redundant.

Figure 13:
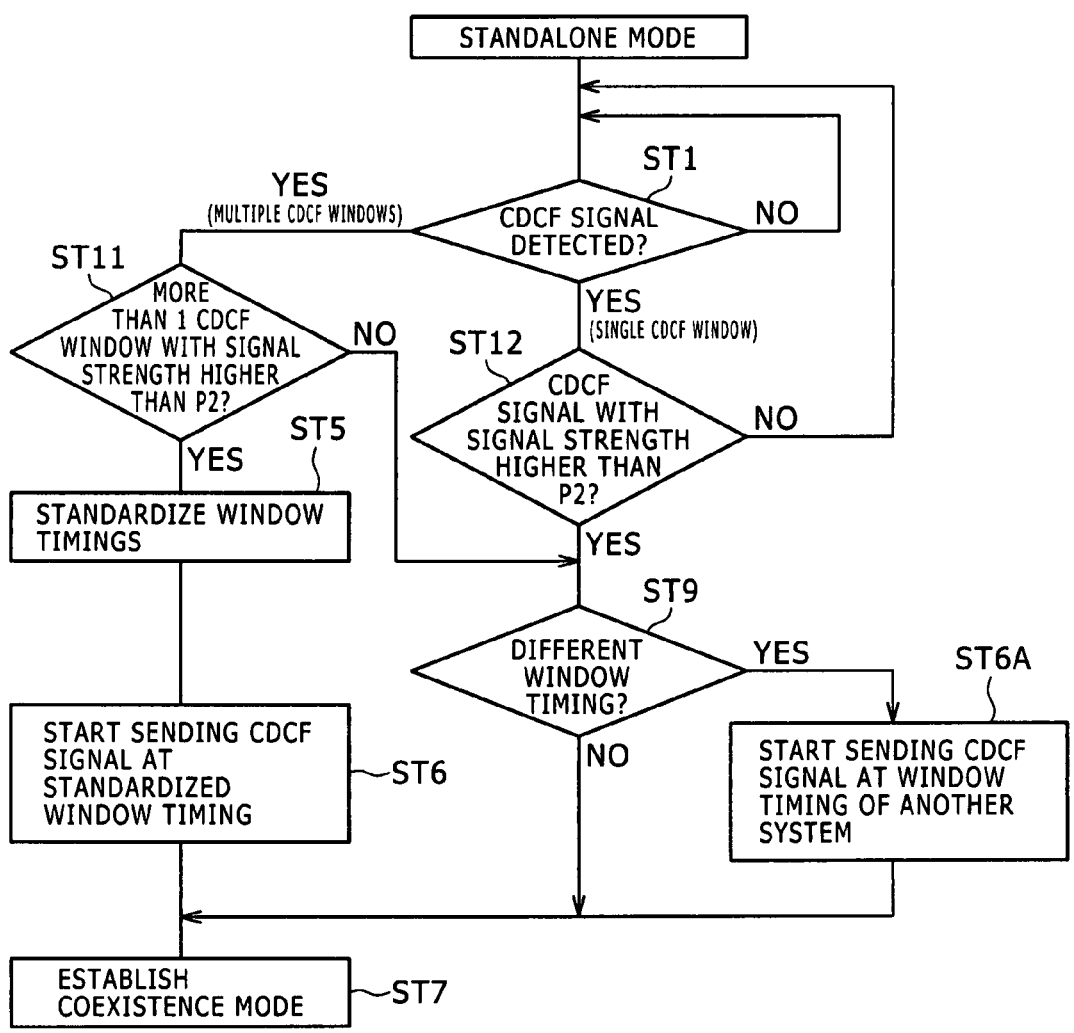
FIG. 13 is a flowchart of steps constituting the first method as it is performed in standalone mode.

FIG. 13 is a flowchart of steps constituting the process of effecting transition from standalone mode to coexistence mode. In standalone mode, this modem transmits its CDCF signal through a CDCF window and makes a band reservation in a manner unique to the own system. In this case, it is possible to transmit the CDCF signal at the same window timing as that of the CDCF signal sent by some other system. If the CDCF signal detected from some other system has a sufficiently low signal strength level, then there is no need for coexistence and standalone mode is maintained. If the detected CDCF signal is found to have a signal strength level of at least P2, then the window timings are standardized as needed and transmission of the own CDCF signal is started in order to effect transition to coexistence mode. The specific steps involved will now be described in reference to FIG. 13.

In standalone mode, detection of a CDCF signal or signals (in step ST1) is typically carried out at predetermined intervals.

If CDCF signals are detected from a plurality of CDCF windows, then step ST11 is reached. In step ST11, the controller 20 in FIG. 10 checks to determine whether there exist a plurality of CDCF windows containing CDCF signals having a signal strength of at least P2 each. The signal level P2 may have any relation in magnitude with the above-mentioned signal level P3. The different timings illustratively mean they are among the above-mentioned 60 timing candidates.

If a plurality of CDCF signals are detected with a signal strength of at least P2 each and if the result of the check in step ST11 is affirmative ("YES"), then step ST5 is reached and the window timings are standardized. Step ST5 is followed by step ST6 in which transmission of the CDCF signal is started at the standardized window timing. Since the different window timings have now been standardized, the window timing of this modem will not overlap with that of the CDCF signal from the other system. Thereafter, step ST7 is reached and transition is effected from standalone mode to coexistence mode.

Where the standardization of window timings is carried out upon transition from one mode to another as described above, the process route applicable to this case is indicated in FIG. 11 as "STANDALONE MODE" followed by "ST1: YES," "ST11: YES," "ST5," "ST6," "ST7" and "COEXISTENCE MODE," in that order.

If in step ST1 a CDCF signal is detected from a single CDCF window, then step ST12 is reached. In step ST12, the controller 20 checks to determine if the CDCF signal has a signal strength of at least P2. If the CDCF signal is found to have a signal strength of at least P2, the result of the check in step ST12 is affirmative ("YES") and step ST9 is reached. In step ST9, the controller 20 in FIG. 10 checks to determine whether the window timing of the detected CDCF signal is different from the window timing of the own system.

If the window timings are found to be different, the result of the check in step ST9 is affirmative ("YES"). In this case, there is a possibility of interference between systems and coexistence mode might be established then and there (in step ST7). Preferably, however, step ST6A may be introduced here and the transmission of the CDCF signal may be started at the window timing of the other system. This step is added to provide for the possibility of interference with some other system which, operating at a different window timing, could suddenly increase its CDCF signal strength. This step is preferably carried out to match the CDCF window of this modem with that of the other system in advance. In this case, similar to the case above, this modem starts sending its CDCF signal at the window timing of the other system, makes a band reservation, and starts outputting a beacon signal to become the master station.

Where one CDCF window is detected together with the CDCF signal having a signal strength of at least P2 and occurring at a different window timing as described above, the process route applicable to this case is indicated in FIG. 11 as "STANDALONE MODE" followed by "ST1: YES," "ST12: YES," "ST9: YES," "ST6A," "ST7" and "COEXISTENCE MODE," in that order.

If the window timings turn out to be the same, the result of the check in step ST9 is negative ("NO"). Then step ST7 is reached and coexistence mode is established.

Where one CDCF window is detected along with the CDCF signal having a signal strength of at least P2 and occurring at the same window timing as that of the own system, the process route applicable to this case is indicated in FIG. 11 as "STANDALONE MODE" followed by "R1" and "COEXISTENCE MODE," in that order.

If the result of the check in step ST12 is negative ("NO"), i.e., if one CDCF window is not detected together with a CDCF signal having a signal strength of at least P2, then there is no need for transition to coexistence mode. In that case, control is returned to before step ST1. The process route applicable to this case is not shown in FIG. 11 because mode transition is not involved.

What takes place with standalone mode in effect according to the first method above may be summarized conceptually, in a manner detached from the specificities of the procedure, into the following four aspects:

(1) If one CDCF window is detected together with the CDCF signal having a signal strength level of at least P2 and occurring at the same window timing as that of the CDCF signal from the own system, then transition is effected to coexistence mode. If the window timings of the CDCF signals are found to coincide with each other, then the master station changes the timing at which to transmit its CDCF signal in the same CDCF window, before effecting transition to coexistence mode.

(2) If one CDCF window is detected together with the CDCF signal having a signal strength level of at least P2 and occurring at a window timing different from that of the CDCF signal sent by the own system, then the master station starts transmitting its CDCF signal at the CDCF window timing of the other system, before effecting transition to coexistence mode.

(3) If a plurality of CDCF windows are detected along with CDCF signals having a signal strength of at least P2 each, the CDCF window timings are standardized. The master station then starts transmitting its CDCF signal at the standardized CDCF window timing of some other system, before effecting transition to coexistence mode.

(4) If the signal strength level of every detected CDCF signal is less than P2, then standalone mode is maintained.

<First Method: Transition from Coexistence Mode to Standalone Mode>

What takes place in coexistence mode according to the first method will now be described in reference to the flowchart of FIG. 14. In the ensuing description, like reference characters will designate like or corresponding steps or processes and their detailed description will be omitted where redundant.

In coexistence mode, a band reservation is made by transmitting a CDCF signal through a CDCF window. At this point, the timing at which to transmit the CDCF signal needs to be arranged to avoid overlapping with the timing of a CDCF signal (with a signal strength level of at least P1) sent by some other system. There is no need to consider coexistence with any other system whose CDCF signal is found to have a signal level of less than P1. If every detected CDCF signal turns out to have a signal strength of less than P1, then transition is effected to standalone mode. The signal level P1 is to be smaller than the above-mentioned level P2. The reason for the staggered signal levels will be explained later. The specific steps involved will now be described in reference to FIG. 14.

Figure 14:
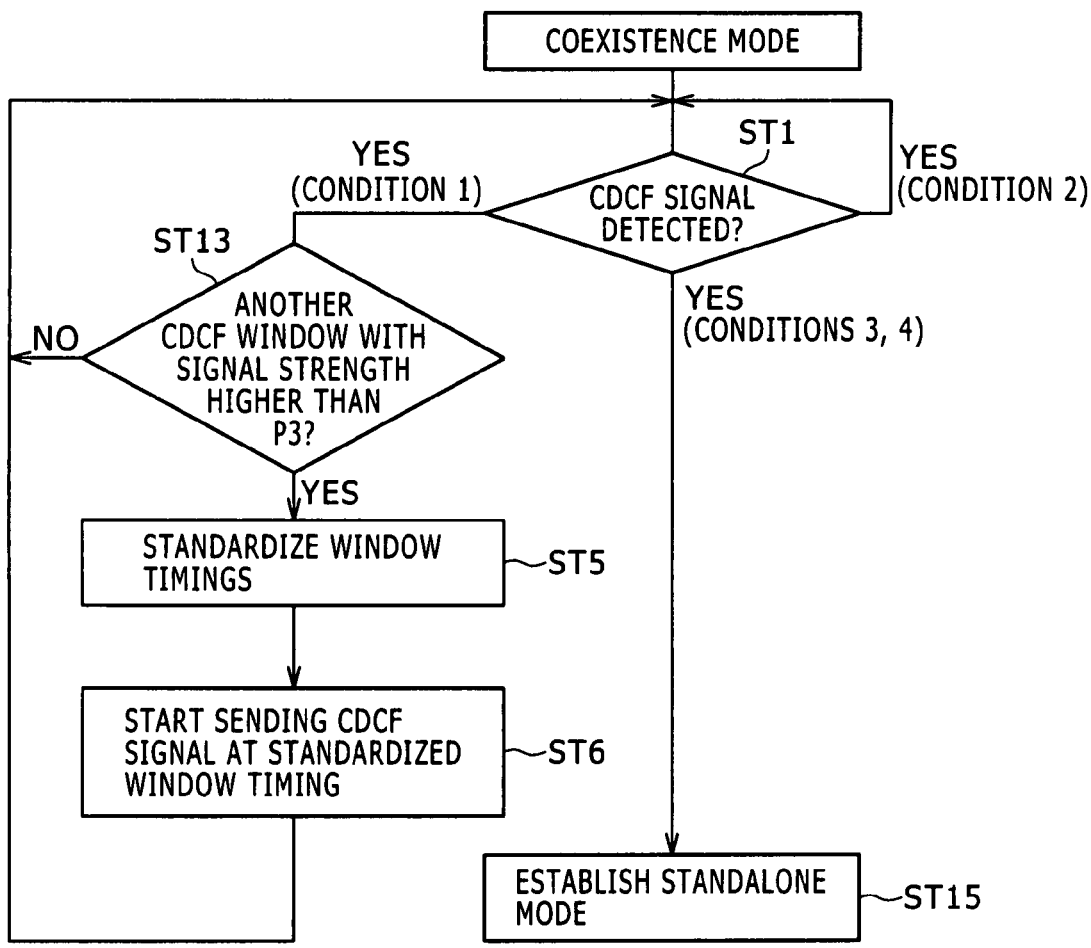
FIG. 14 is a flowchart of steps constituting the first method as it is carried out in coexistence mode.

FIG. 14 is a flowchart of steps outlining what is performed in coexistence mode.

In standalone mode, detection of a CDCF signal or signals (in step ST1) is typically carried out at predetermined intervals. The detection involves searching for the presence of any CDCF signal along with its strength in the CDCF window used by this modem, and for the presence of any CDCF window in addition to the CDCF window utilized by this modem.

Illustratively, on the basis of the result of detection of the CDCF signal, the controller 20 in FIG. 10 makes the following decisions and controls the process flow accordingly: a check is first made to see if the signal strength of the CDCF signal transmitted in the CDCF window used by this modem is at least P1. If the CDCF signal sent in the CDCF window used by this modem is found to have a signal strength of at least P1, then the condition for coexistence is met. In this case, control is returned to before step ST1 so as to maintain coexistence mode, and the next timing of detection is awaited.

In step ST1, however, the strength of a CDCF signal transmitted in any other CDCF is also detected apart from the CDCF signal found in the CDCF window used by this modem. Depending on the result of this detection, it may be preferred to standardize the window timings.

More specifically, if a CDCF signal with a signal strength of at least P3 is found transmitted in any other CDCF window, then the result of the check in step ST13 is affirmative ("YES"). In this case, step ST5 is reached and the window timings are standardized as described above. Step ST5 is followed by step ST6 in which the transmission of the CDCF signal is started at the standardized window timing. Since the different window timings have now been standardized, the window timing of this modem will not overlap with that of the CDCF signal from the other system. Thereafter, control is returned to before step ST1, and step ST1 is typically repeated at predetermined intervals.

If the result of the check in step ST13 is negative ("NO"), i.e., if no CDCF signal with a signal strength of at least P1 is detected in any other CDCF window, then control is returned to before step ST1 provided the CDCF signal sent in the CDCF window used by this modem has a signal strength of at least P1.

If the check in step ST1 fails to detect any CDCF signal with a signal strength of at least P1 in the CDCF window of this modem, then step ST15 is reached. In step ST15, transition is effected from coexistence mode to standalone mode. The process route applicable to this case is indicated in FIG. 11 as "COEXISTENCE MODE," "R2" and "STANDALONE MODE," in that order.

As described above, the branching from step ST1 may be effected under the following four conditions:

Condition 1: A CDCF window is detected at a timing different from that of the CDCF window used by this modem.

Condition 2: A CDCF signal having a signal strength of at least P1 is detected in the CDCF window used by this modem.

Condition 3: A CDCF signal is detected in the CDCF window used by this modem but the signal strength is less than P1.

Condition 4: No CDCF signal is detected in the CDCF window used by this modem.

What follows is an explanation of the staggered relationship in magnitude between the signal levels P1 and P2.

If there were only one threshold level by which to select either coexistence mode or standalone mode, there could be unduly frequent transition between the two modes depending on the CDCF signal level coming slightly above or below the reference level. This phenomenon is prevented by establishing two threshold levels P1 and P2 (signal strength levels), P2 being higher than P1. This provides a degree of hysteresis for the switching between coexistence mode and standalone mode.

There is a possibility that CDCF signals may be transmitted at the same window timing. If any other CDCF signal is found transmitted at the same timing as that of the CDCF signal sent by this modem, then there is no way of detecting the other CDCF signal. This problem is resolved by the second or the third method, to be described below.

<Outlines of the Second and the Third Methods>

According to the above-described first method, transition from power-on to standalone mode may be effected by way of step ST6A as illustrated in FIG. 11. In step ST6A, transmission of the CDCF signal is started at the window timing of some other system. Upon transition from standalone mode to coexistence mode, the CDCF signal is also transmitted at the window timing of some other system, as in step ST6A or ST6.

The above arrangement of the first method is suitable for the standardization of window timings.

That is, the CDCF signal is transmitted to the destination modem at the same window timing as that of the own system. Where the window timings are standardized, it is easy to detect the incoming CDCF signal.

One disadvantage with the above arrangement is as follows: if the destination modem receiving the CDCF signal has the same structure as that of this embodiment shown in FIG. 10, then the CDCF signal detector 32 of the modem usually detects signal pattern correlations using a correlator. As mentioned above, the CDCF signal can be detected even at a low signal strength level. That means frequent usage of, and a heavy processing load on, the correlator. During the recurrent operation, the controller 20 controlling the CDCF signal detector 32 is incapable of efficiently carrying out other tasks such as CDCF signal transmission. In other words, the operation of the correlator for CDCF signal detection can interfere with the own system executing window timing-related tasks.

The disadvantage above is circumvented illustratively by one of three methods: by intentionally staggering window timings (second method); by stopping CDCF signal transmission upon transition to standalone mode (third method); or by intermittently (e.g., randomly) stopping CDCF signal transmission (fourth method). The ensuing description will focus on the second and the third methods. The methods will be explained primarily by showing how different they are from the first method. In the description that follows, like reference characters will designate like or corresponding steps or processes and their detailed description will be omitted where redundant.

<Second Method>

Figure 15:
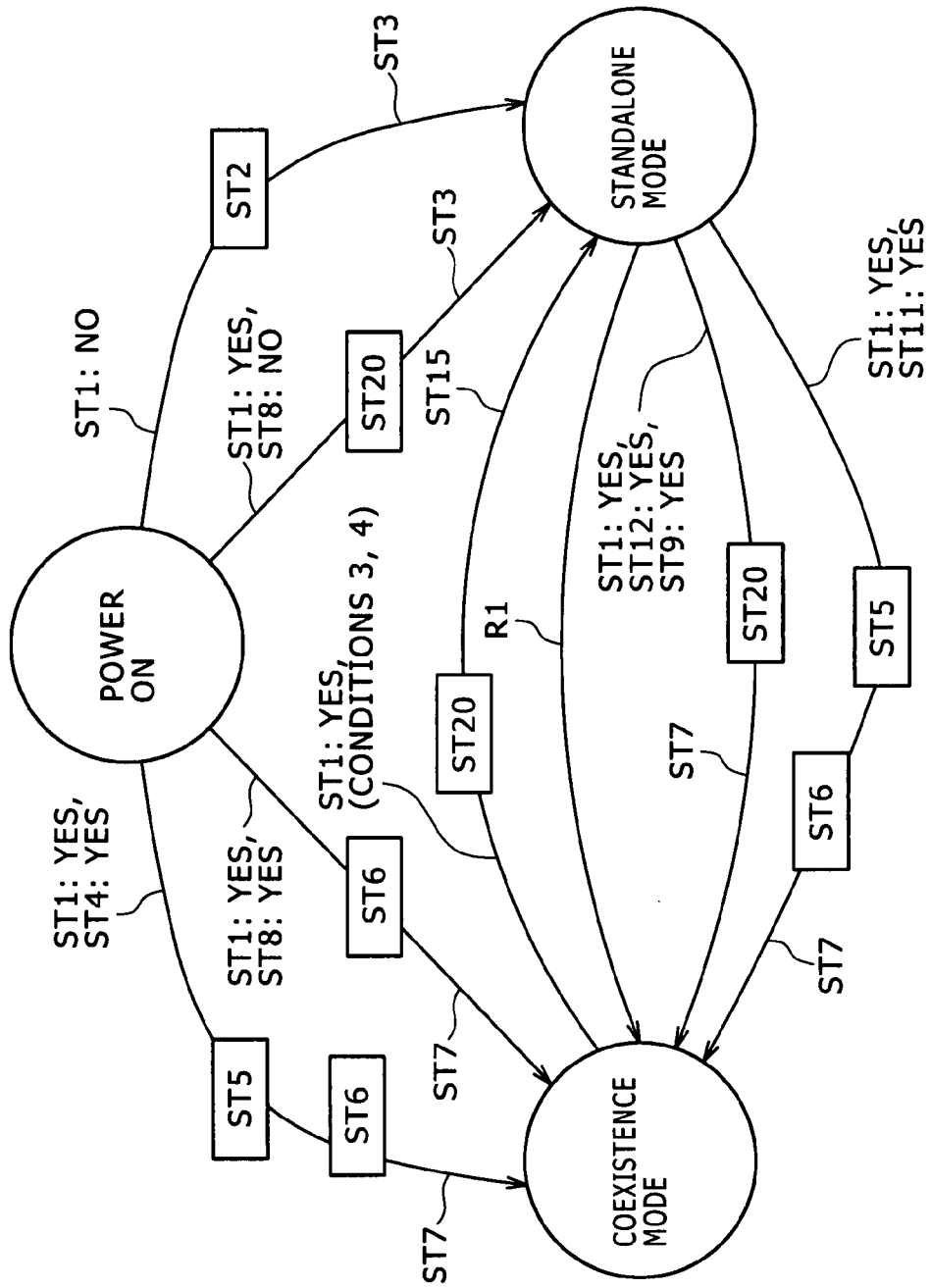
FIG. 15 is a state transition diagram of a second method according to the present invention.
Figure 16:
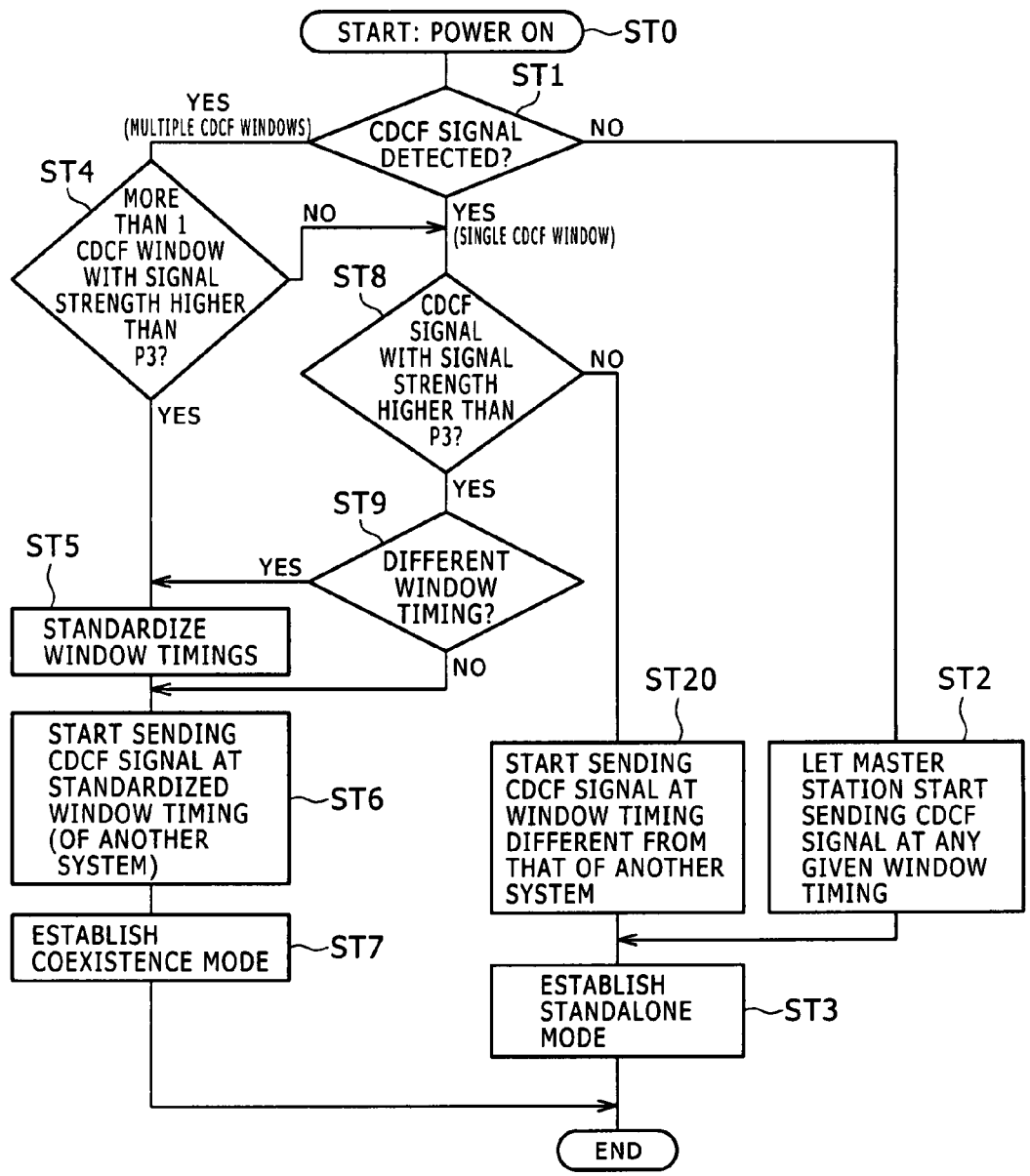
Figure 17:
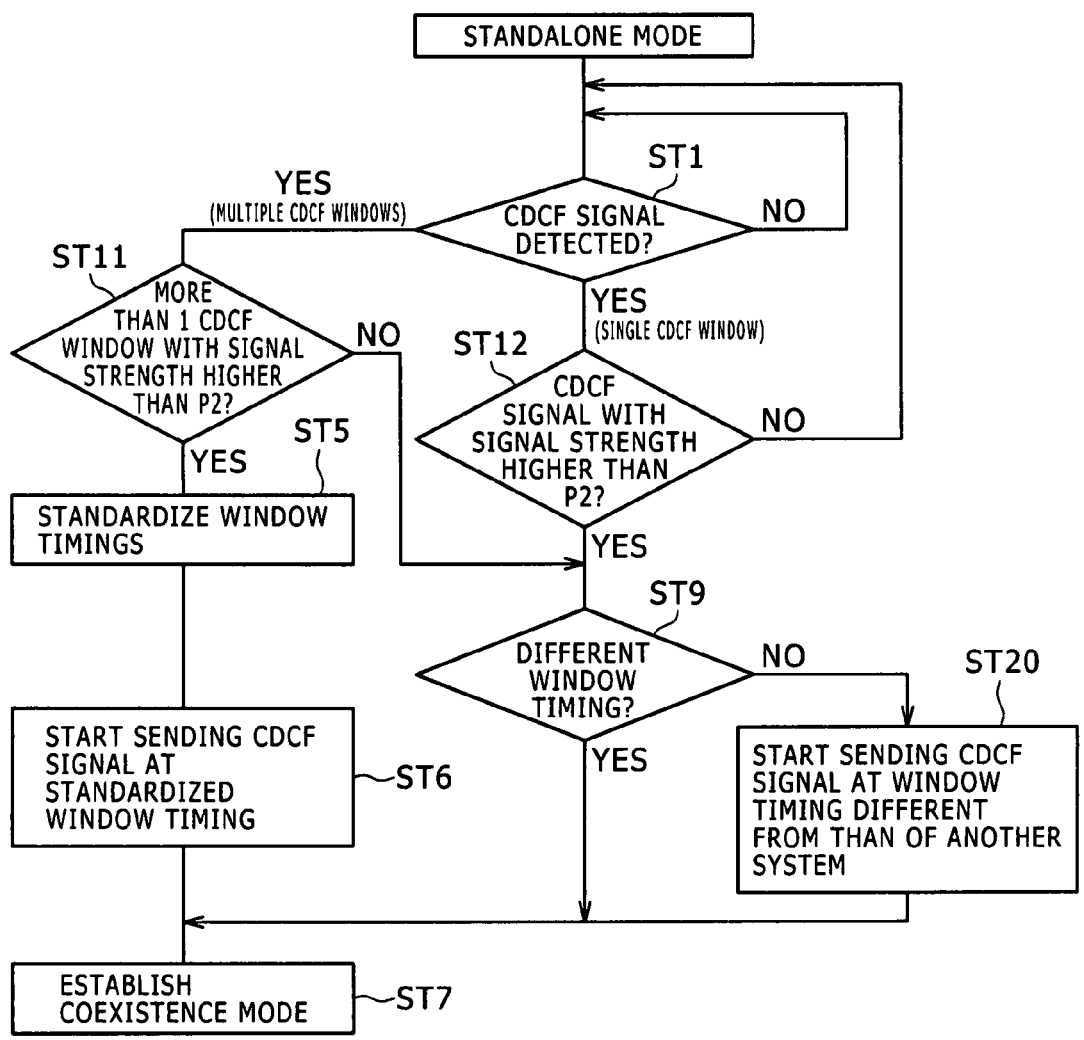
FIG. 17 is a flowchart of steps constituting the second method as it is performed in standalone mode.
Figure 18:
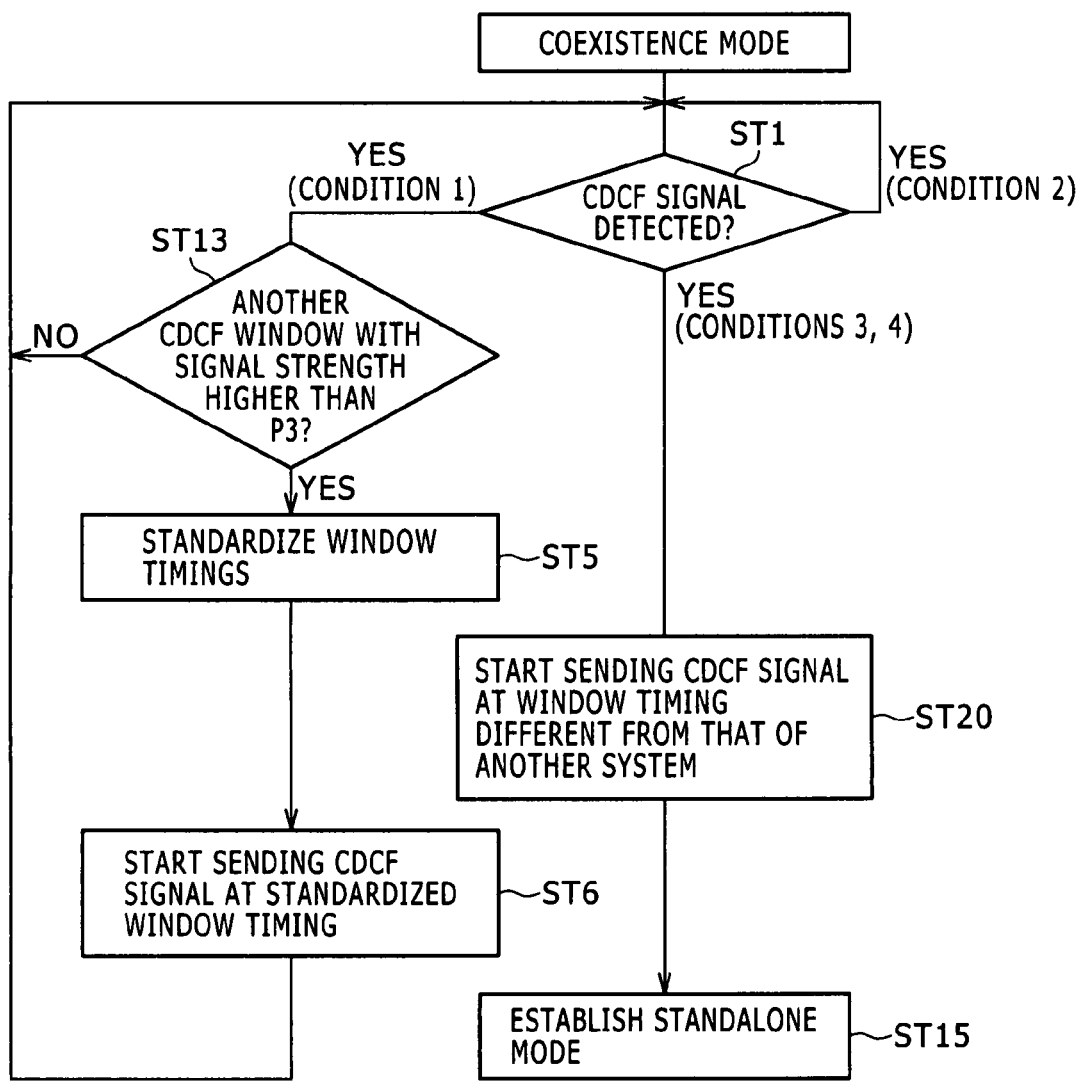
FIG. 18 is a flowchart of steps constituting the second method as it is carried out in coexistence mode.

FIG. 15 is a state transition diagram of the second method. FIG. 16 is a flowchart of steps constituting the second method carried out at power-on. FIG. 17 is a flowchart of steps constituting the second method as it is performed in standalone mode. FIG. 18 is a flowchart of steps constituting the second method as it is conducted in coexistence mode.

Comparing FIG. 15 with FIG. 11 reveals a first difference. That is, transition from power-on to standalone mode passes not through step ST6A but through step ST20. Whereas the passage through step ST6A was shown to be optional, the execution of step ST20 is mandatory.

Step ST20 is reached and carried out by the controller 20 in FIG. 10 controlling the CDCF signal generator 34, selector circuit 35, and transmission processor if the result of the check in step ST8 of FIG. 16 is negative ("NO"), i.e., if no CDCF signal with a signal strength of at least P3 is detected.

In step ST20, the master station starts transmitting its CDCF signal at a window timing different from that of some other system outputting a CDCF signal with a signal strength of at least P3. Step ST20 is followed by step ST3 in which standalone mode is established.

Comparing FIG. 15 with FIG. 11 also reveals a second difference. That is, transition from standalone mode to coexistence mode passes not through step ST6A but through step ST20.

Step ST20 is reached and carried out if the result of the check in step ST19 in FIG. 17 is negative ("NO"), i.e., if upon detection of a CDCF signal with a signal strength of at least P2, the window timing of that CDCF signal turns out to be the same as the window timing of the own system; transition is effected accordingly to coexistence mode (in step ST7). The other details of step ST20 are the same as in the preceding case.

Furthermore, the comparison of FIG. 15 with FIG. 11 reveals a third difference. That is, step ST20 is introduced anew into the transition from coexistence mode to standalone mode.

Step ST20 is reached and carried out if the result of the check in step ST1 in FIG. 18 is conditionally affirmative ("YES" under conditions 3, 4), i.e., if there is no CDCF signal detected with a signal strength of at least P1 in the CDCF window of this modem (under conditions 3 and 4); transition is effected accordingly to standalone mode (in step ST15). The other details of step ST20 are the same as in the preceding case.

With any one of the first through the third differences described above, the station (modem) of another system that is to receive the CDCF signal transmitted following step ST20 can receive that CDCF signal at a window timing different from that of the own system. That means the modem of the own system can concentrate on its tasks during the period corresponding to the band window of the own system. From the viewpoint of the ease of CDCF signal reception, the preferred timing is one which is different from the window timing of the other system but not too much separated therefrom.

How to determine the timing is discretionary. Preferably, however, the timing may be determined using random numbers so as to avoid unduly biased timing distribution. It is also possible to limit the range in which to generate such random numbers. This will prevent cases in which the window timing is far too different from the window timing of the other system. The capability of generating random numbers may be incorporated in the controller 20 shown in FIG. 10.

<Third Method>

Figure 19:
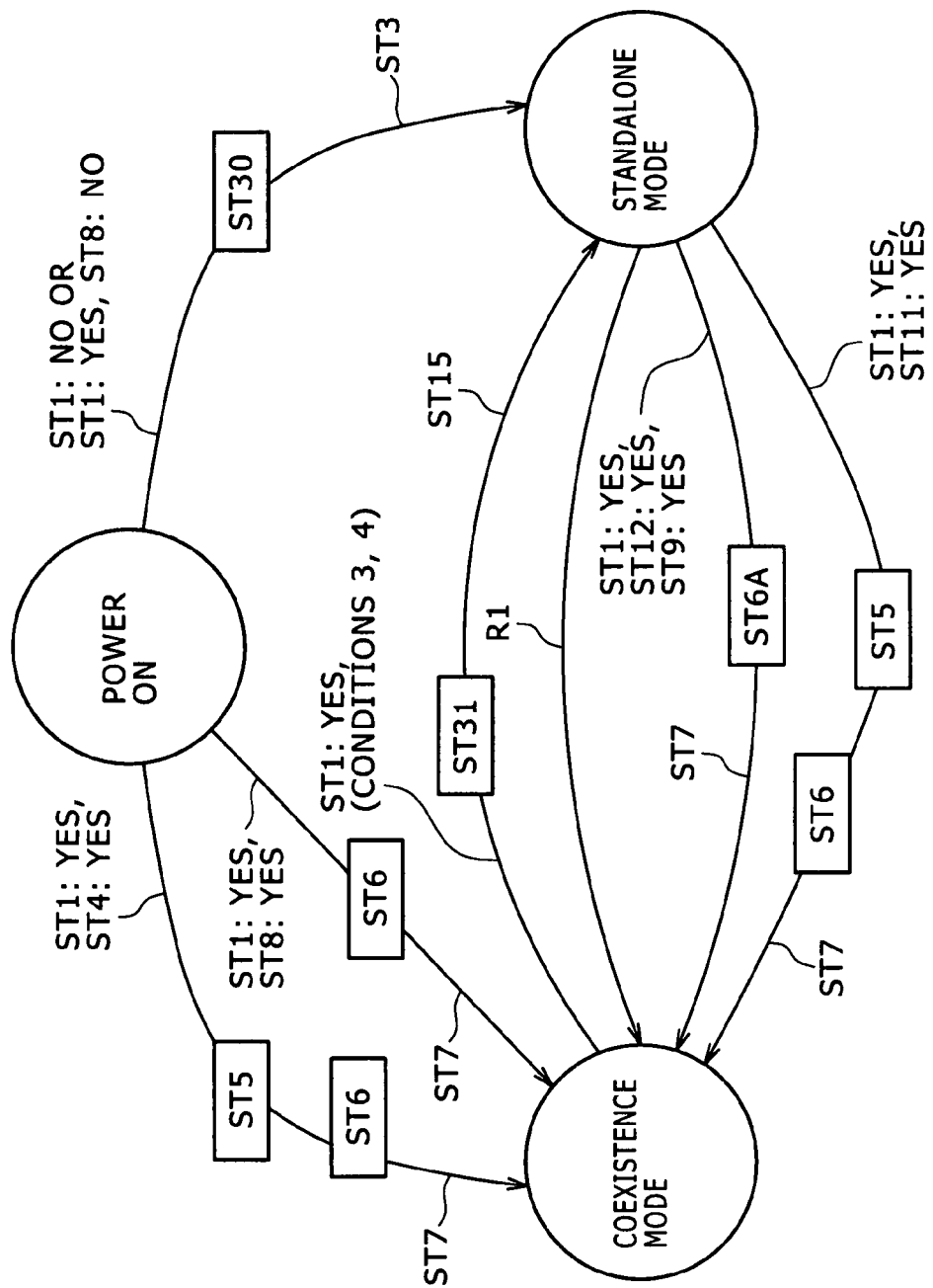
FIG. 19 is a state transition diagram of a third method according to the present invention.
Figure 20:
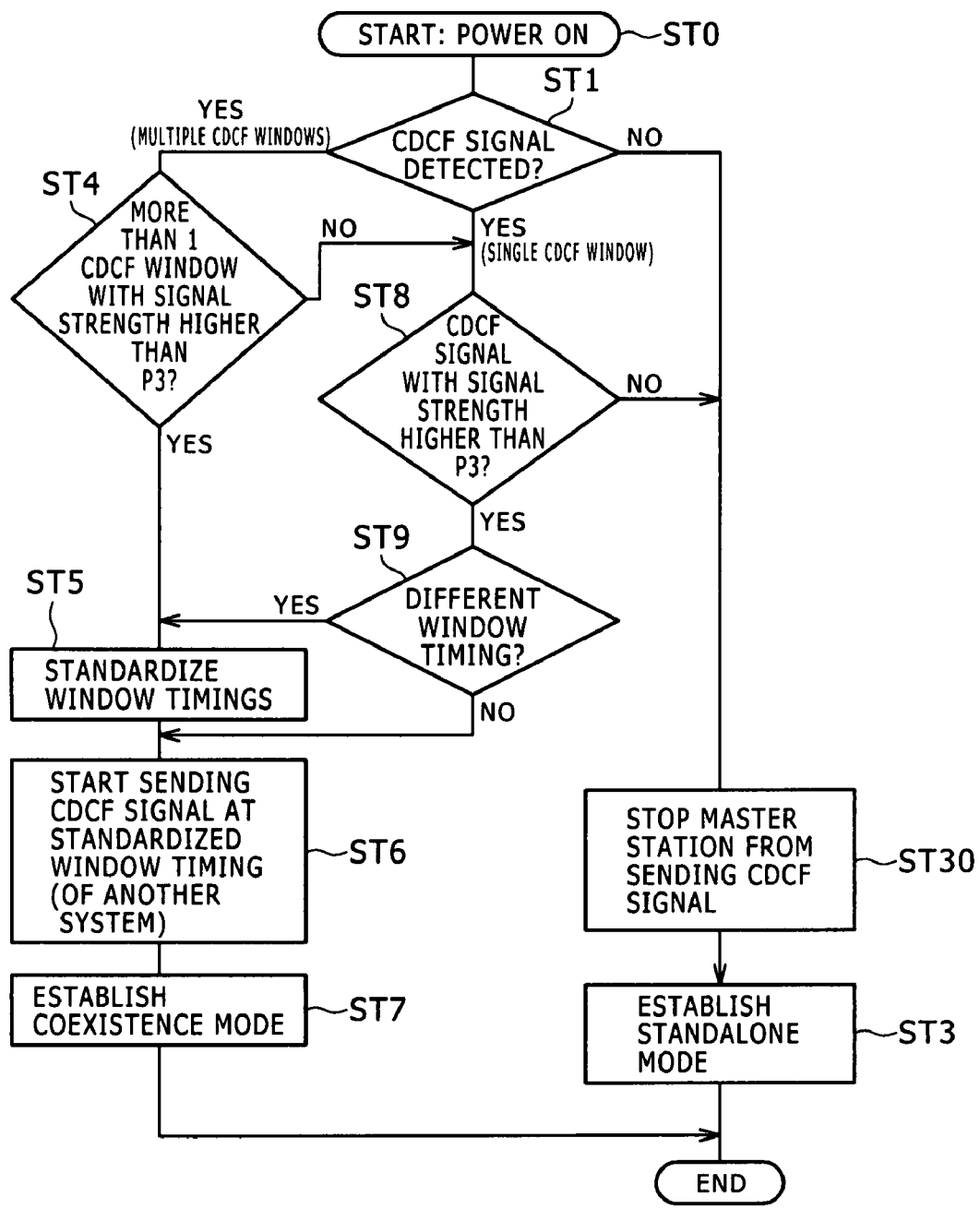
Figure 21:
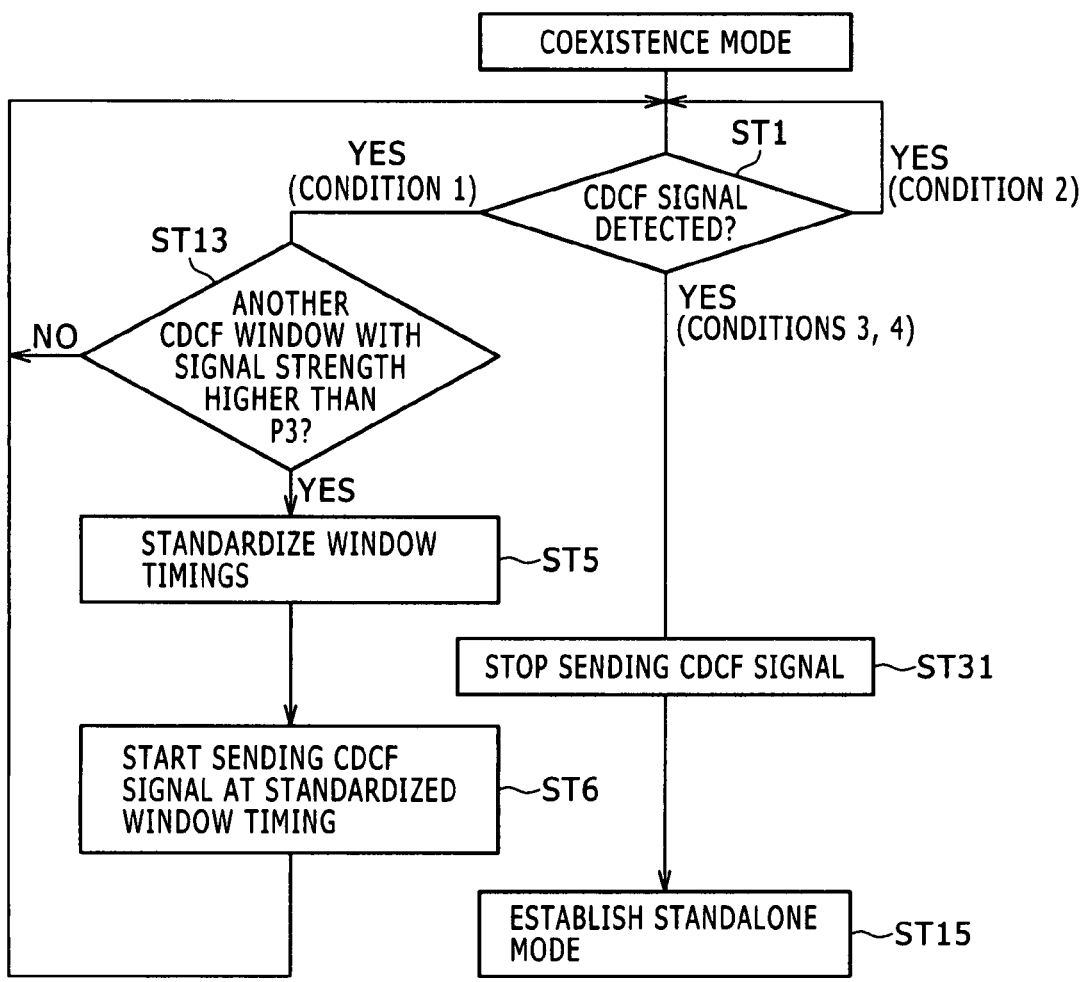
FIG. 21 is a flowchart of steps constituting the third method as it is performed in coexistence mode.

FIG. 19 is a state transition diagram of the third method. FIG. 20 is a flowchart of steps constituting the third method executed at power-on. FIG. 21 is a flowchart of steps constituting the third method as it is performed in coexistence mode.

Comparing FIG. 19 with FIG. 11 discloses a first difference. That is, transition from power-on to standalone mode passes not through step ST2 but through step ST30. The process route involving step ST6A is limited to that which passes through step ST30.

The routing above is expressed by the flowchart of FIG. 20. Step ST30 is reached if the result of the check in step ST1 in FIG. 20 is negative ("NO") with no CDCF signal detected, or if every detected CDCF signal has a signal strength of less than P3 ("NO" in step ST8). In step ST30, the controller 20 in FIG. 10 controls the CDCF signal generator 34, selector circuit 35, and transmission controller so as to suppress CDCF signal transmission. Thereafter, step ST3 is reached and standalone mode is established.

Comparing FIG. 19 with FIG. 11 also discloses a second difference. That is, the route R2 in effect in FIG. 11 upon transition from coexistence mode to standalone mode is replaced by a new route in FIG. 19 which passes through step ST31.

The routing above is expressed by the flowchart of FIG. 21. Step ST31 is reached if the result of the check in step ST1 in FIG. 21 is conditionally affirmative ("YES" under conditions 3, 4), i.e., if no CDCF signal with a signal strength of at least P1 is detected in the CDCF window of this modem (under conditions 3 and 4). In step ST31, CDCF signal transmission is stopped. Thereafter, standalone mode is established in step ST15.

With any one of the first and the second differences described above, the other system cannot receive the CDCF signal past step ST30 or ST31. The other system is thus incapable of recognizing the system to which the modem having stopped transmitting its CDCF signal belongs. However, CDCF signal transmission is halted upon detection of a communication environment where the possibility of interference between systems is minimal, i.e., an environment in which every detected CDCF signal in the CDCF window used by this modem has a signal strength of less than P1. For that reason, the inability to recognize systems generally results in little disadvantage. Since the modem that has halted CDCF signal detection still keeps detecting (or periodically detects) any CDCF signal, the transmission of the CDCF signal is resumed upon detection of an environment conducive to triggering interference between systems.

A major advantage stemming from the stopped CDCF signal transmission is that an inactive correlator alleviates the control burden on the controller 20. In turn, the controller 20 can concentrate efficiently on the other tasks.

As the fourth method, CDCF signal transmission may be stopped illustratively in random fashion. Following the halt of CDCF signal transmission, the transmission may be automatically resumed. In such cases, at least the stopping or the resumption of CDCF signal transmission may be determined using random numbers. The capability of generating such random numbers may be incorporated in the controller 20 shown in FIG. 10.

Where the third or the fourth method is in effect, the transition from standalone mode to coexistence mode may be controlled in the same manner as by the first or the second method discussed above in reference to FIG. 13 or 17 and thus will not be discussed further.

According to the above-described embodiment of the present invention, it is possible to transmit data at the same timing as some other PLC modem as long as the possibility of interference therewith is minimal. This helps improve communication capacity. When coexistence mode is established to provide against interference or when standalone mode is set up to take advantage of the absence of interference, the inventive arrangements permit smooth transition from one mode to the other while ensuring the proper functioning of the configured modems in each mode.

It should be understood by those skilled in the art that various modifications, combinations, sub-combinations and alterations may occur depending on design requirements and other factor in so far as they are within the scope of the appended claims or the equivalents thereof.

The invention claimed is:

1. A power line communication apparatus which is assigned a band window and a communication band in alternate and cyclical fashion, said band window being one to which a coexistence signal for band reservation is assignable, said communication band being one to which desired information is assignable, said power line communication apparatus comprising:

a reception processor configured to receive and process a signal from a power line communication network;

a coexistence signal detector configured to detect, from the signal received by said reception processor, the presence and signal strength of said coexistence signal, and the timing of said band window which is assigned said coexistence signal;

a coexistence signal generator configured to generate a coexistence signal;

a transmission processor configured to process a signal and transmit the processed signal onto said power line communication network; and a controller configured to effect control to establish either coexistence mode or standalone mode at power-on, said coexistence mode being one in which said band reservation is made by causing said coexistence signal generator to generate said coexistence signal and by having said transmission processor transmitting the generated coexistence signal, said standalone mode being one in which said band reservation utilizing said coexistence signal is not carried out; said controller being further configured to effect control to make transition from one of the two modes to the other; said establishment of one of said two modes and said transition therebetween being controlled on the basis of said coexistence signal being detected by said coexistence signal detector, on the basis of the signal strength of said coexistence signal if the presence of the signal is detected, or on the basis of both the signal strength of said coexistence signal and the timing of said band window which is assigned said coexistence signal, wherein, with said standalone mode in effect, said controller effects transition to the coexistence mode when at least one band window which is assigned a coexistence signal having a signal strength of at least a predetermined level P2 is detected, and wherein, with said coexistence mode in effect, said controller effects transition to the standalone mode when every detected coexistence signal has a signal strength of less than a predetermined level P1, the level P1 being less than the level P2.

2. The power line communication apparatus according to claim 1, wherein said controller establishes said standalone mode if said coexistence signal is not detected, or if every coexistence signal detected has a signal strength of less than a predetermined level P3; and wherein said controller establishes said coexistence mode if at least one coexistence signal is detected at power-on and if the signal strength of at least one of the detected coexistence signals is at least on said level P3.

3. The power line communication apparatus according to claim 2, wherein, if all coexistence signals detected at power-on are found to have signal strength levels less than said level P3, then said controller controls said coexistence signal generator and said transmission processor in such a manner as to transmit a coexistence signal at the timing of said band window of each detected coexistence signal.

4. The power line communication apparatus according to claim 2, wherein, if one band window is detected which is assigned a coexistence signal with a signal strength of at least said level P3 upon establishment of said coexistence mode, then said controller controls said coexistence signal generator and said transmission processor in such a manner as to transmit a coexistence signal through a band window at the same timing as that of the detected band window; and wherein, if a plurality of band windows are detected each of which is assigned a coexistence signal with a signal strength of at least said level P3 upon establishment of said coexistence mode, then said controller controls said coexistence signal generator and said transmission processor in such a manner as to standardize the timings of the detected plurality of band windows and to transmit a coexistence signal through a band window at the standardized timing.

5. The power line communication apparatus according to claim 2, wherein, with said standalone mode in effect, if said coexistence signal is not detected or if the signal strengths of all detected coexistence signals are less than the predetermined level P2, then said controller maintains said standalone mode;

wherein, with said standalone mode in effect, if a plurality of band windows are detected each of which is assigned a coexistence signal with a signal strength of at least said level P2, then said controller controls said coexistence signal generator and said transmission processor in such a manner as to standardize the timings of the detected plurality of band windows, transmit a coexistence signal through a band window at the standardized timing, and effect transition to said coexistence mode; and wherein, with said standalone mode in effect, if one band window is detected which is assigned a coexistence signal with a signal strength of at least said level P2, then said controller effects transition to said coexistence mode without standardizing the timing of the detected band window.

6. The power line communication apparatus according to claim 5, wherein, upon transition to said coexistence mode without standardization of the timing of said band window, if the timing of the detected band window with the assigned coexistence signal is different from the timing of the band window assigned to this apparatus, then said controller controls said coexistence signal generator and said transmission processor in such a manner as to transmit a coexistence signal through a band window at a timing different from that of this apparatus before effecting transition to said coexistence mode.

7. The power line communication apparatus according to claim 5, wherein, with said coexistence mode in effect, if at least one of the detected coexistence signals has a signal strength of at least the predetermined level, then said controller may maintain said coexistence mode; and wherein, with said coexistence mode in effect, if no coexistence signal is detected, then said controller effects transition to said standalone mode.

8. The power line communication apparatus according to claim 5, wherein, with said coexistence mode in effect, if at least one of the detected coexistence signals has a signal strength of at least the predetermined level P1, then said controller may maintain said coexistence mode; and wherein, with said coexistence mode in effect, if no coexistence signal is detected, or if every detected coexistence signal has a signal strength of less than said level P1 and if the timing of every detected coexistence signal is different from the timing of the band window assigned to this apparatus, then said controller controls said coexistence signal generator and said transmission processor in such a manner as to transmit a coexistence signal through a band window at a timing different from that of this apparatus before effecting transition to said standalone mode.

9. The power line communication apparatus according to claim 2, wherein, if every coexistence signal detected at power-on has a signal strength of less than said level P3, then said controller effects transition to said standalone mode without transmitting a coexistence signal.

10. The power line communication apparatus according to claim 5, wherein, with said coexistence mode in effect, if at least one of the detected coexistence signals has a signal strength of at least the predetermined level P1, then said controller may maintain said coexistence mode; and wherein, with said coexistence mode in effect, if no coexistence signal is detected, or if every detected coexistence signal has a signal strength of less than said level P1, then said controller controls said coexistence signal generator and said transmission processor in such a manner as to stop transmitting a coexistence signal before effecting transition to said standalone mode.

11. The power line communication apparatus according to claim 10, wherein said controller using random numbers determines at least either the time at which to stop sending said coexistence signal or the time ranging from the stopping of coexistence signal transmission to resumption of the signal transmission, and controls said coexistence signal generator and said transmission processor in such a manner as to stop transmitting said coexistence signal and to resume the transmission.

12. A method for operating a power line communication apparatus which is assigned a band window and a communication band in alternate and cyclical fashion, said band window being one to which a coexistence signal for band reservation is assignable, said communication band being one to which desired information is assignable, said method comprising the steps of:

detecting, from a received signal, the presence and signal strength of said coexistence signal, and the timing of said band window which is assigned said coexistence signal;

checking to determine, upon detection of said coexistence signal, whether a plurality of coexistence signals are detected from a plurality of band windows occurring at staggered intervals; and effecting control in such a manner as to establish either coexistence mode or standalone mode at power-on, said coexistence mode being one in which said band reservation is made by generating said coexistence signal and by transmitting the generated coexistence signal, said standalone mode being one in which said band reservation utilizing said coexistence signal is not carried out; said control effecting step further effecting control to make transition from one of the two modes to the other; said establishment of one of said two modes and said transition therebetween being controlled on the basis of said coexistence signal being detected, on the basis of the signal strength of said coexistence signal if the presence of the signal is detected, or on the basis of both the signal strength of said coexistence signal and the timing of said band window which is assigned said coexistence signal;

wherein, with said standalone mode in effect, effecting transition to the coexistence mode when at least one band window which is assigned a coexistence signal having a signal strength of at least a predetermined level P2 is detected, and wherein, with said coexistence mode in effect, effecting transition to the standalone mode when every detected coexistence signal has a signal strength of less than a predetermined level P1, the level P1 being less than the level P2.

* * * * *